(12) United States Patent
Shirayanagi

(10) Patent No.: US 6,419,549 B2
(45) Date of Patent: Jul. 16, 2002

(54) MANUFACTURING METHOD OF SPECTACLE LENSES AND SYSTEM THEREOF

(75) Inventor: Moriyasu Shirayanagi, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/793,550

(22) Filed: Feb. 27, 2001

(30) Foreign Application Priority Data

Feb. 29, 2000 (JP) .................................. 2000-054736
Oct. 17, 2000 (JP) .................................. 2000-317239

(51) Int. Cl.⁷ .............................................. B24B 49/00
(52) U.S. Cl. ............................................ 451/5; 451/42
(58) Field of Search ........................... 451/5, 8, 41, 42, 451/240, 255, 277

(56) References Cited

U.S. PATENT DOCUMENTS

| | | |
|---|---|---|
| 3,434,781 A | 3/1969 | Davis et al. |
| 3,645,610 A | 2/1972 | Duckwall et al. |
| 3,960,442 A | 6/1976 | Davis et al. |
| 4,310,225 A | 1/1982 | Davis |
| 5,790,232 A | 8/1998 | Hagiwara et al. |
| 6,193,370 B1 | 2/2001 | Shirayanagi |
| 6,199,983 B1 * | 3/2001 | Kato et al. .................. 351/169 |

FOREIGN PATENT DOCUMENTS

| | | |
|---|---|---|
| EP | 0710526 | 5/1996 |
| EP | 0880046 | 11/1998 |
| JP | 8-320457 | 12/1996 |
| JP | 10175149 | 6/1998 |
| JP | 11119167 | 4/1999 |

OTHER PUBLICATIONS

English Language Abstract of JP–11–119167.

* cited by examiner

*Primary Examiner*—Timothy V. Eley
*Assistant Examiner*—Dung Van Nguyen
(74) *Attorney, Agent, or Firm*—Greenblum & Bernstein, P.L.C.

(57) ABSTRACT

The manufacturing system of spectacle lenses includes a computer, an input device to input data to the computer, a display and an aspherical surface processing machine. An operator input customer's data to the computer with the input device. The computer selects and determines a substantially common shape for front surfaces of the right and left lenses among predetermined shapes according to a selecting program based on the input specifications. The selecting program selects the common shape that stands midway between shapes of the front surfaces of the right and left lenses when these lenses are independently designed. The computer calculates shape data of the back surfaces, on the basis of the specifications and the selected shape of the front surfaces. Then the operator places the semifinished lens blank whose front surface agrees with the selected common shape on the machine. After the placement, the computer controls the machine to process (grind) the back surface of the semifinished lens blank based on the shape data.

13 Claims, 31 Drawing Sheets

(R)　　　　　(L)

(R)　　　　　(L)

(R)    (L)

(R)    (L)

—— AS∞  ---- AS₃₀₀    —— AS∞  ---- AS₃₀₀
(R)                    (L)

(R)                    (L)

(R)    (L)

(R)    (L)

(R)   (L)

—— $AS_\infty$  ---- $AS_{300}$   —— $AS_\infty$  ---- $AS_{300}$
(R)   (L)

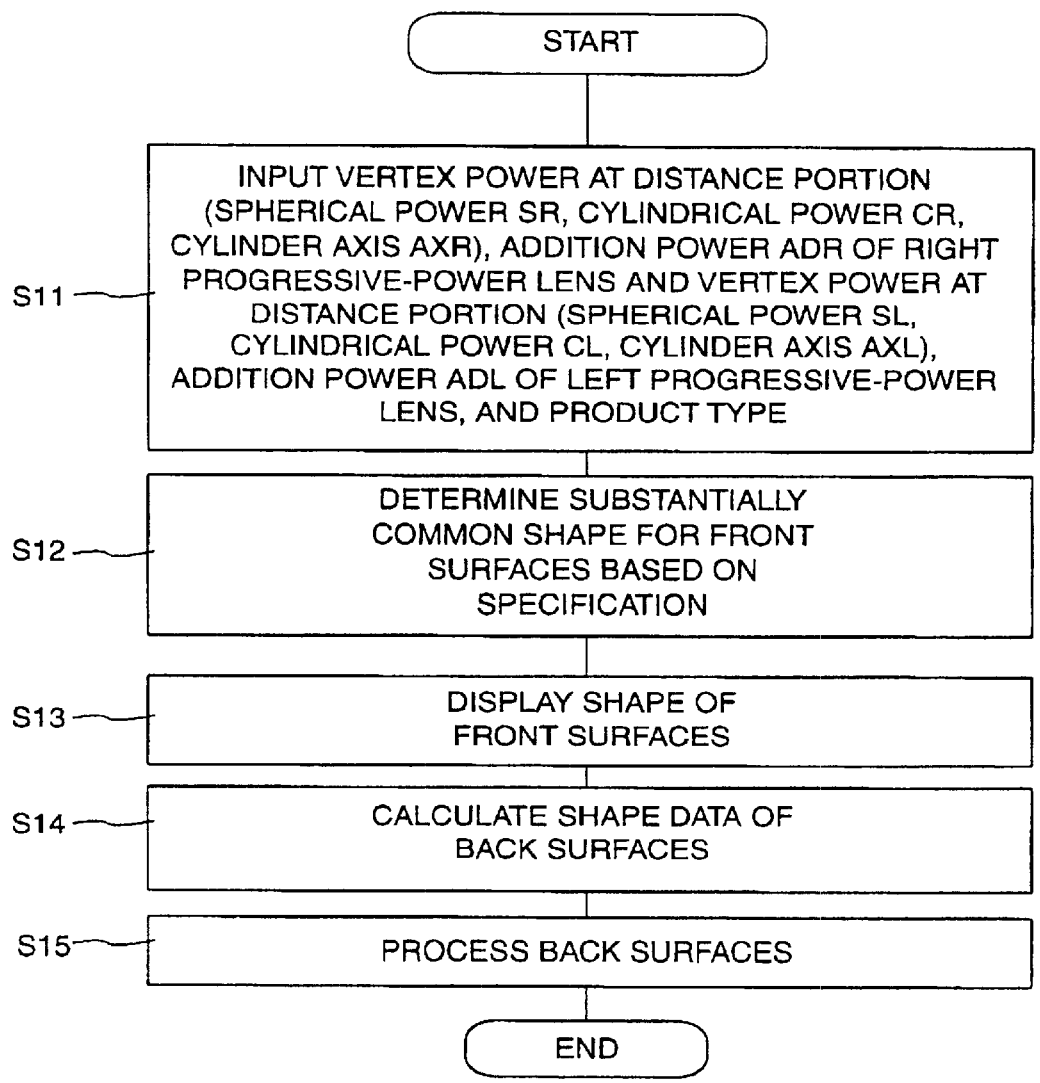

FIG. 21A FIG.21B
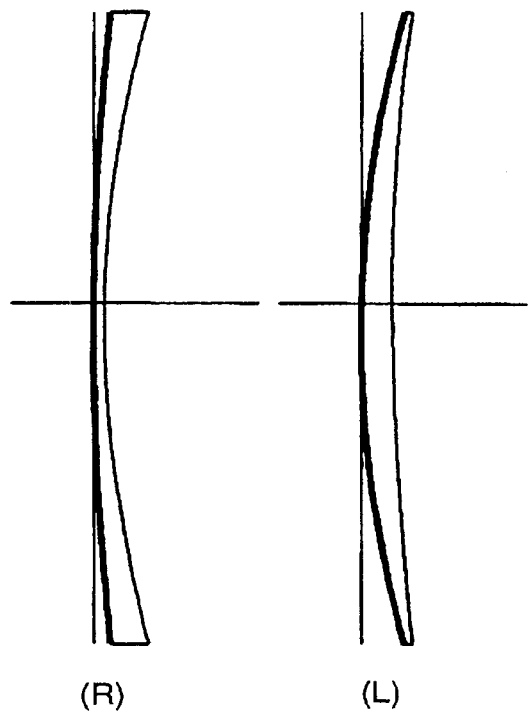
(R) (L)
FIG. 22A FIG.22B
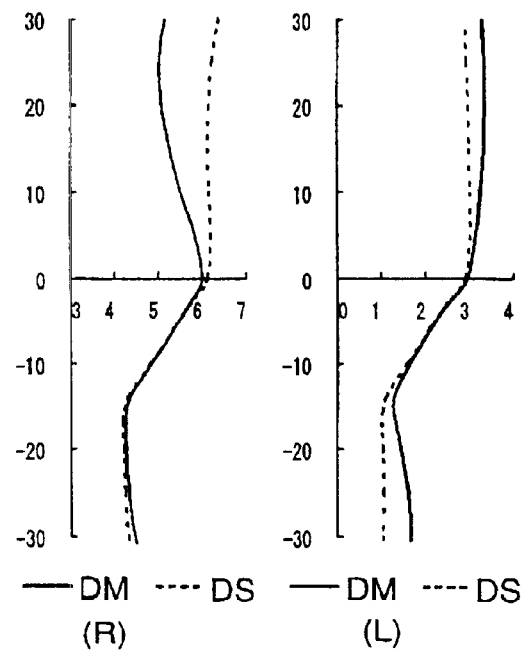
——DM ----DS   ——DM ----DS
(R) (L)

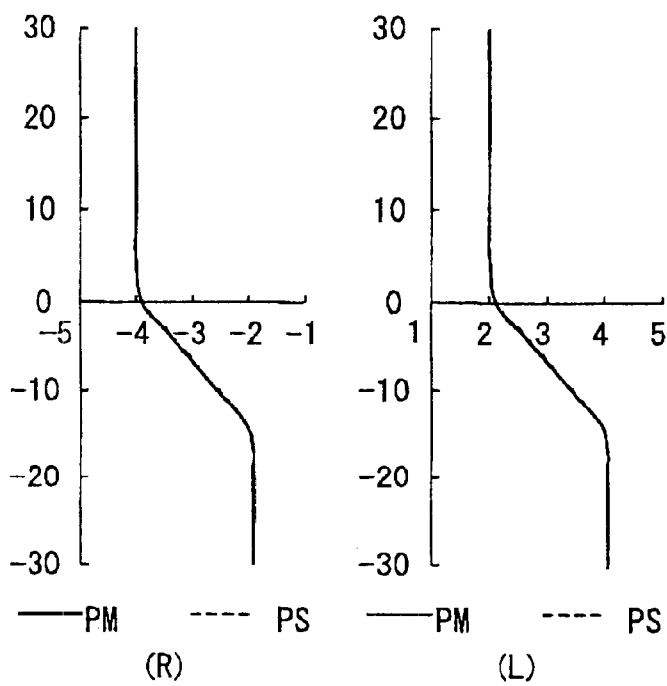
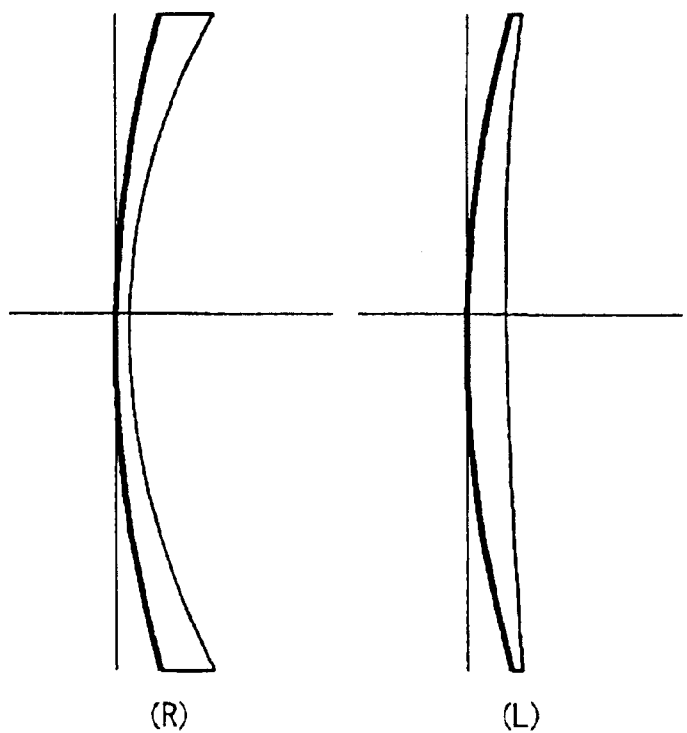

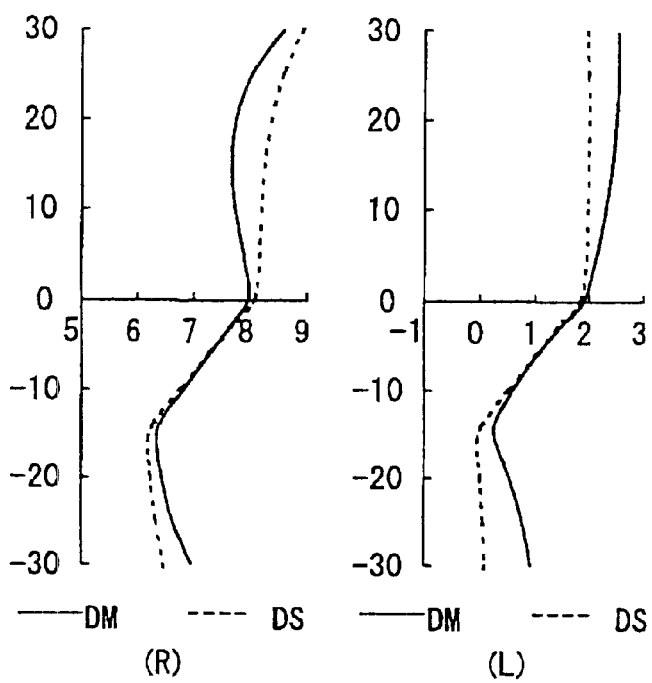
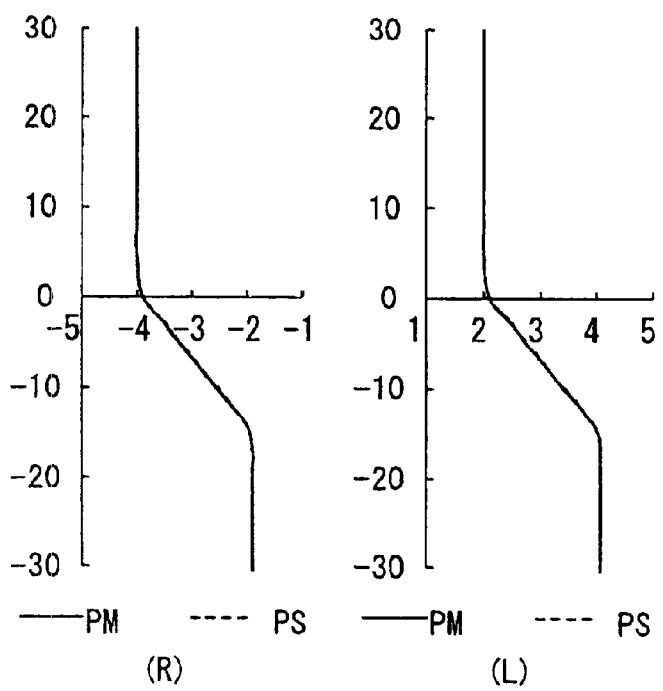

(R)   (L)

—— DM  ---- DS    —— DM  ---- DS
(R)              (L)

(R)   (L)

(R)   (L)

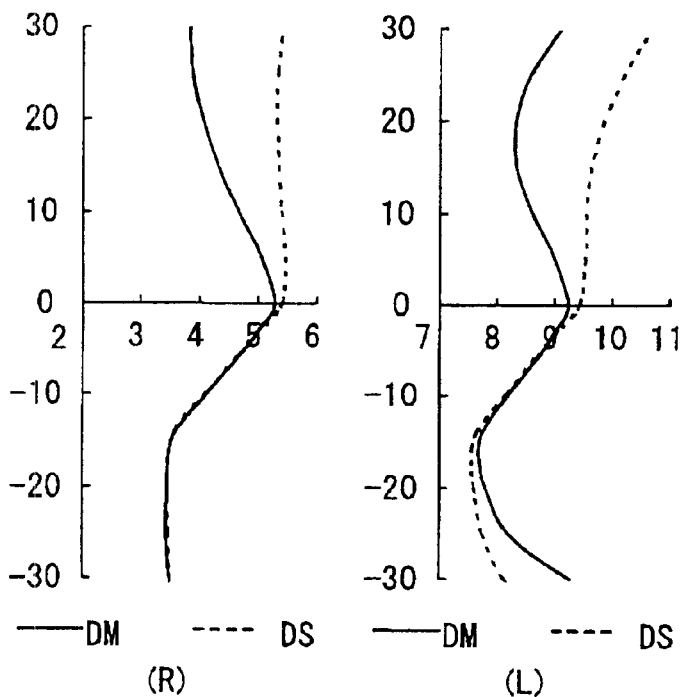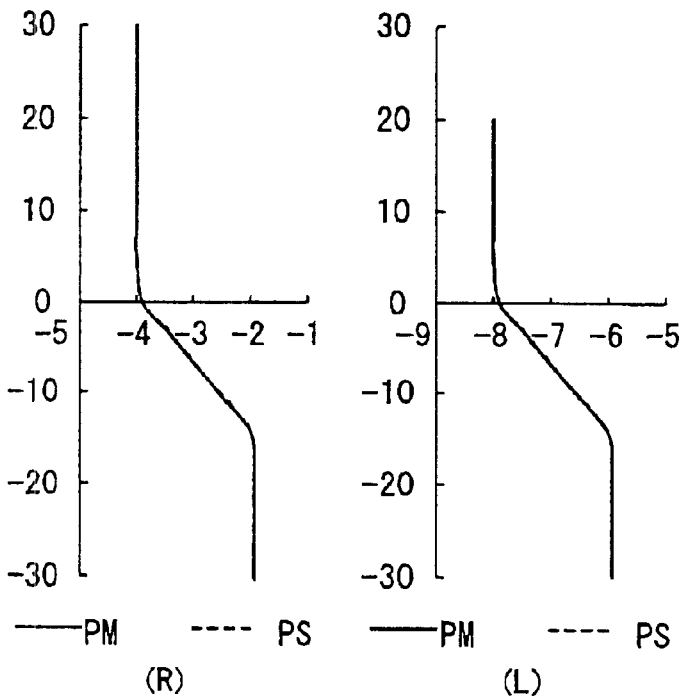

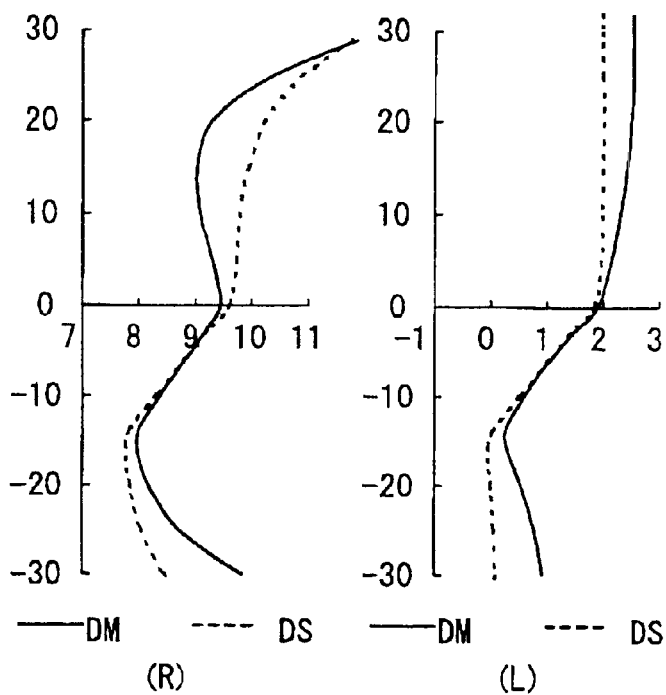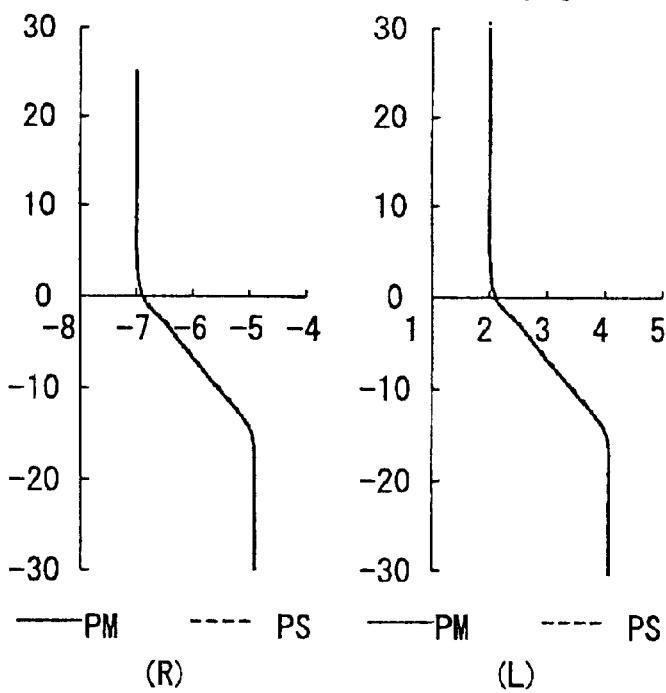

(R)    (L)

(R)    (L)

(R)  (L)

(R)  (L)

(R)  (L)

(R)  (L)

(R)  (L)

——DM ---- DS   ——DM ---- DS
(R)              (L)

(R)  (L)

(R)  (L)

MANUFACTURING METHOD OF SPECTACLE LENSES AND SYSTEM THEREOF

BACKGROUND OF THE INVENTION

The present invention relates to a manufacturing method of right and left spectacle lenses and system thereof. Particularly, the present invention is effective when the right and left spectacle lenses have different focal powers to each other. The spectacle lenses may be single-vision lenses or progressive-power lenses.

Spectacles consist of right and left lenses and a frame that holds these lenses. When the powers required for the right and left lenses are equal to each other, shapes of the front surface (an object side) and the back surface (an eye side) of the right lens are the same as that of the left lens. On the other hand, when right and left lenses whose powers required are largely different are independently designed, the shape of the right lens is largely different from the shape of the left lens, which loses a balance between the shapes of the right and left lenses, exacerbating an outward appearance thereof. Since the outward appearance depends on the shapes of the front surfaces, the shapes of the front surfaces should be identical with each other to enhance the outward appearance.

A technique to equate shapes of front surfaces to keep the balance between right and left lenses has been known as prior art. For instance, Japanese patent provisional publication No. Hei 8-320457 discloses the technique to independently design shapes of right and left lenses according to a prescription at a first step, and to redesign at least one of the right and left lenses so that the curvatures of the front surfaces are approximate to each other.

However, the above described publication does not describe optical performances of right and left lenses after the redesigning. In general, since a lens form (i.e., a combination of shapes of front and back surfaces) to produce the given focal power is limited to minimize aberrations, when the lens is redesigned with only considering the shapes of the front surfaces, the aberrations becomes large, exacerbating the optical performance.

Namely, in the case of a spherical lens, a lens form to minimize aberrations is substantially uniquely determined with respect to the focal power when the lens material is predetermined. Therefore, when the focal powers required for right and left lenses are different to each other, the aberrations of at least one of the right and left lenses must increase as a result of redesigning to equate the shapes of the front surfaces.

On the other hand, in the case of an aspherical lens, a range of choices of shapes for a specific refractive power is broader than in a spherical lens. However, when the difference between the focal powers of the right and left lenses becomes large, it is inevitable that the aberration increases due to the redesigning. A conventional aspherical spectacle lens has an aspherical front surface and a spherical back surface. Semifinished lens blanks whose aspherical front surfaces are finished are stockpiled in a manufacturing factory. In a conventional manufacturing method, shapes of front surfaces of right and left lenses are determined among various predetermined shapes based on specifications of a customer in a first step. In a second step, curvatures of back surfaces of the right and left lenses are calculated on the basis of the specification and the determined shape of the front surfaces. In an actual processing step, a pair of semifinished lens blanks are selected among various stockpiled blanks and they are placed on a surface processing machine. Then, the back surfaces of the selected semifinished lens blanks are processed with the surface processing machine on the basis of the calculated curvatures. There are different types of semifinished lens blanks corresponding to various focal powers. That is, the entire range of a focal power required for a spectacle lens is divided into a plurality of sections and each aspherical surface is assigned to each section. Since processing of an aspherical surface was difficult with the conventional processing machine, it was important to limit the types of aspherical surfaces in order to reduce manufacturing cost.

Each aspherical surface is designed so as to keep an optical performance when the aspherical surface covers the focal power within the specific section. Therefore, when a lens having a predetermined focal power is manufactured using an aspherical surface that is assigned to a different section, the optical performance becomes worse significantly. Namely, when the aspherical front surfaces of right and left lenses whose focal powers are not within the same section are formed to be identical, an optical performance of either right lens or left lens that employs an aspherical surface of the different section becomes worse significantly.

Design examples of conventional single-vision spherical lenses and conventional single-vision aspherical lenses will be described.

FIGS. 39A and 39B are sectional views of the conventional spherical lenses when the right and left lenses are independently designed. In the drawings described below, (R) represents the right lens and (L) represents the left lens. In each lens diagram, the surface at the left is a front surface and the surface at the right is a back surface. In this example, spherical powers (SPH) required for the right and left lenses are −4.00 diopter and +2.00 diopter, respectively. TABLE 1 shows numerical construction of each lens. In TABLE 1, R1 denotes a radius of curvature of the front surface, R2 denotes a radius of curvature of the back surface, T denotes a center thickness, N denotes a refractive index and φ denotes a diameter of the semifinished lens blank. Units of R1, R2, T and φ are millimeters (mm).

TABLE 1

|     | (R)     | (L)     |
| --- | ------- | ------- |
| SPH | −4.000  | 2.000   |
| R1  | 150.000 | 85.714  |
| R2  | 74.906  | 117.693 |
| T   | 1.000   | 3.147   |
| N   | 1.600   | 1.600   |
| φ   | 70.000  | 70.000  |

Base curves (surface power of front surface) of the right and left lenses are 4.00 diopter and 7.00 diopter, respectively. FIGS. 40A and 40B show astigmatisms of the right and left lenses. In each of graphs, a solid line represents the astigmatism $A_\infty$ for distance vision (object distance: ∞) and a dotted line represents the astigmatism $AS_{300}$ for near vision (object distance: 300 mm). In the graphs of astigmatism, the horizontal axis denotes an amount of astigmatism (unit: diopter) and the vertical axis denotes a visual angle (unit: degree).

The respective spectacle lenses have satisfactory optical performances, while the outward appearance lacks in balance between the right and left lenses because of the difference between the base curves. Thus, the design of the left lens will be changed such that the base curve of the left lens matches to that of the right lens. Numerical constructions after the design change are shown in TABLE 2. FIGS. 41A and 41B show sectional views of the spectacle lenses after the design change. FIGS. 42A and 42B show astigmatisms $AS_\infty$ for distance vision and the astigmatism $AS_{300}$ for near vision of the spectacle lenses after the design change.

TABLE 2

|     | (R)     | (L)     |
|-----|---------|---------|
| SPH | −4.000  | 2.000   |
| R1  | 150.000 | 150.000 |
| R2  | 74.906  | 295.421 |
| T   | 1.000   | 3.060   |
| N   | 1.600   | 1.600   |
| φ   | 70.000  | 70.000  |

Since the base curves of the right and left lenses become identical (4.00 diopter), the front surfaces have the common shape. As shown in FIG. 42B, however, the astigmatism of the left lens for distance vision becomes significantly large as compared with the condition before the design change.

Next an example of aspherical lenses will be described. FIGS. 43A and 43B are sectional views of the conventional aspherical lenses that are independently designed. The front surfaces are rotationally symmetrical aspherical surfaces and the back surfaces are spherical surfaces. In this example, SPH required for the right and left lenses are −4.00 diopter and −8.00 diopter, respectively. TABLE 3 shows numerical construction of each lens. R1 represents a radius of curvature at the center.

TABLE 3

|     | (R)     | (L)      |
|-----|---------|----------|
| SPH | −4.000  | −8.000   |
| R1  | 300.000 | 1200.000 |
| R2  | 99.958  | 70.587   |
| T   | 1.000   | 1.000    |
| N   | 1.600   | 1.600    |
| φ   | 70.000  | 70.000   |

FIGS. 44A and 44B are graphs showing variations of surface powers of the front surfaces. The variation of the surface power is represented as a difference between the surface power at a point along a meridional plane and the paraxial surface power. In the graphs of surface power, the horizontal axis denotes the difference of the surface powers and the vertical axis denotes the distance from the center of the front surface (unit: mm). The base curves of the right and left lenses are 2.00 diopter and 0.50 diopter, respectively. FIGS. 45A and 45B show astigmatisms $AS_\infty$ for distance vision and the astigmatism $AS_{300}$ for near vision.

The respective spectacle lenses have satisfactory optical performances, while the outward appearance lacks in balance between the right and left lenses because of the difference between the base curves. Thus, the design of the left lens will be changed such that the base curve of the left lens matches to that of the right lens. Numerical constructions after the design change are shown in TABLE 4. FIGS. 46A and 46B show sectional views of the spectacle lenses after the design change. FIGS. 47A and 47B show variations of surface powers of the spectacle lenses after the design change. FIGS. 48A and 48B show astigmatisms $AS_\infty$ for distance vision and the astigmatism AS300 for near vision of the spectacle lenses after the design change.

TABLE 4

|     | (R)     | (L)     |
|-----|---------|---------|
| SPH | −4.000  | −8.000  |
| R1  | 300.000 | 300.000 |
| R2  | 99.958  | 59.982  |
| T   | 1.000   | 1.000   |
| N   | 1.600   | 1.600   |
| φ   | 70.000  | 70.000  |

Since the base curves of the right and left lenses become identical (2.00 diopter), the front surfaces have the common shape. As shown in FIG. 48B, however, the astigmatism of the left lens for near vision becomes significantly large as compared with the condition before the design change.

The above described problem also holds true for progressive-power spectacle lenses.

When a progressive-power lens designed by a spherical design method, a lens form to minimize aberrations is substantially uniquely determined with respect to the focal power when the lens material is predetermined. Therefore, when the focal powers required for right and left progressive-power lenses are different to each other, the aberrations of at least one of the right and left progressive-power lenses must increase as a result of redesigning to equate the shapes of the front surfaces.

The spherical design method is the method in which a main meridian that extends across the progressive-power surface in an up-and-down direction is designed as an umbilical line having no surface astigmatism.

On the other hand, an aspherical design method is the method in which the main meridian is designed as a non-umbilical line having surface astigmatism. Since the aspherical design method has a higher degree of flexibility than the spherical design method, the progressive-power surface designed by the aspherical design method can keep a satisfactory optical performance while using a smaller curvature surface than the surface designed by the spherical design method.

According to the aspherical design method, the range of shapes to select from becomes wider than the case when the surface is designed by the spherical design method. However, when the difference between the focal powers required for right and left progressive-power lenses becomes large, increasing of the aberrations due to the redesigning is inevitable.

A conventional progressive-power spectacle lens has a progressive-power surface as a front surface and a spherical surface or a toric surface as a back surface. Progressive-power semifinished lens blanks whose progressive-power front surfaces are finished are stockpiled in a manufacturing factory. A back surface of a progressive-power semifinished lens blank is processed to adjust the curvature thereof based on specifications of a customer. There are different types of progressive-power semifinished lens blanks corresponding to various focal powers. Each progressive-power surface is assigned to each section. Since processing of a progressive-power surface was difficult with the conventional processing machine, it was important to limit the types of progressive-power surfaces in order to reduce manufacturing cost.

Each progressive-power surface is designed so as to keep an optical performance when the progressive-power surface covers the focal power within the specific section. Therefore, when a lens having a predetermined focal power is manufactured using a progressive-power surface that is assigned to a different section, the optical performance becomes worse significantly. Namely, when the progressive-power front surfaces of right and left lenses whose focal powers are not within the same section are formed to be identical, an optical performance of either right lens or left lens that employs a progressive-power surface of the different section becomes worse significantly.

Design examples of conventional progressive-power lenses designed by the spherical design method and conventional progressive-power lenses designed by the aspherical design method will be described.

FIGS. 49A and 49B are sectional views of the conventional progressive-power lenses that are independently designed by the spherical design method. The front surfaces are progressive-power surface and the back surfaces are spherical surfaces. In this example, spherical powers (SPH) at a distance portion required for the right and left lenses are −4.00 diopter and +2.00 diopter, respectively. An addition power (ADD) is 2.00 diopter for both of the right and left lenses. TABLE 5 shows numerical construction of each lens. In TABLE 5, D1 denotes a surface power of the front surface at the distance portion, D2 denotes a surface power of the back surface. Units of D1 and D2 are diopter. The mark "*" attached to D1 or D2 represents that the marked surface is a progressive-power surface.

TABLE 5

|     | (R)   | (L)   |
|-----|-------|-------|
| SPH | −4.00 | 2.00  |
| ADD | 2.00  | 2.00  |
| D1* | 4.00  | 7.00  |
| D2  | 8.00  | 5.00  |
| T   | 1.26  | 3.98  |
| N   | 1.60  | 1.60  |
| φ   | 70.00 | 70.00 |

FIGS. 50A and 50B are graphs showing variations of surface powers of the progressive-power front surfaces of the right and left lenses. In the graphs, a solid line represents the surface power DM in a vertical direction along the main meridian and a dotted line represents the surface power DS in a horizontal direction. Base curves (surface power in the distance portion of front surface) of the right and left lenses are 4.00 diopter and 7.00 diopter, respectively. There are no surface astigmatisms (i.e. difference between DM and DS), because the lenses are designed by the spherical design method.

FIGS. 51A and 51B are graphs showing variations of "as-worn" powers of the right and left lenses. The horizontal axis denotes the "as-worn" power (unit: diopter) and the vertical axis denotes the distance from the center of the front surface (unit: mm). In the graphs, a solid line represents the "as-worn" power PM in a vertical direction along the main meridian and a dotted line represents the "as-worn" power PS in a horizontal direction.

The respective spectacle lenses have satisfactory optical performances, while the outward appearance lacks in balance between the right and left lenses because of the difference between the base curves. Thus, the design of the left progressive-power lens will be changed such that the base curve of the left progressive-power lens matches to that of the right lens. Numerical constructions after the design change are shown in TABLE 6. FIGS. 52A and 52B show sectional views of the progressive-power spectacle lenses after the design change.

TABLE 6

|     | (R)   | (L)   |
|-----|-------|-------|
| SPH | −4.00 | 2.00  |
| ADD | 2.00  | 2.00  |
| D1* | 4.00  | 4.00  |
| D2  | 8.00  | 2.00  |
| T   | 1.26  | 3.82  |
| N   | 1.60  | 1.60  |
| φ   | 70.00 | 70.00 |

FIGS. 53A and 53B are graphs showing variations of the surface powers DM and DS after the design change. FIGS. 54A and 54B are graphs showing variations of the "as-worn" powers PM and PS after the design change. The base curves of the right and left progressive-power lenses become identical (4.00 diopter) and the front surfaces have the common shape. As shown in FIG. 54B, however, the astigmatism (i.e., difference between PM and PS) of the left lens becomes significantly large as compared with the condition before the design change.

FIGS. 55A and 55B are sectional views of conventional progressive-power lenses designed by the aspherical design method that are independently designed. The front surfaces are progressive-power surface and the back surfaces are spherical surfaces. In this example, SPH at a distance portion required for the right and left lenses are −4.00 diopter and −8.00 diopter, respectively. ADD is 2.00 diopter for both of the right and left lenses. TABLE 7 shows numerical construction of each lens.

TABLE 7

|     | (R)   | (L)   |
|-----|-------|-------|
| SPH | −4.00 | −8.00 |
| ADD | 2.00  | 2.00  |
| D1* | 2.00  | 0.50  |
| D2  | 6.00  | 8.50  |
| T   | 1.29  | 1.33  |
| N   | 1.60  | 1.60  |
| φ   | 70.00 | 70.00 |

FIGS. 56A and 56B are graphs showing variations of the surface powers DM and DS. Base curves of the right and left lenses are 2.00 diopter and 0.50 diopter, respectively. FIGS. 57A and 57B are graphs showing variations of the "as-worn" powers PM and PS.

The respective spectacle lenses have satisfactory optical performances, while the outward appearance lacks in balance between the right and left lenses because of the difference between the base curves. Thus, the design of the left progressive-power lens will be changed such that the base curve of the left progressive-power lens matches to that of the right lens. Numerical constructions after the design change are shown in TABLE 8. FIGS. 58A and 58B show sectional views of the progressive-power spectacle lenses after the design change.

TABLE 8

|     | (R)   | (L)   |
|-----|-------|-------|
| SPH | −4.00 | −8.00 |
| ADD | 2.00  | 2.00  |
| D1* | 2.00  | 2.00  |
| D2  | 6.00  | 10.00 |
| T   | 1.29  | 1.32  |

TABLE 8-continued

|   | (R)   | (L)   |
|---|-------|-------|
| N | 1.60  | 1.60  |
| φ | 70.00 | 70.00 |

FIGS. 59A and 59B are graphs showing variations of the surface powers DM and DS. FIGS. 60A and 60B are graphs showing variations of the "as-worn" powers PM and PS. The base curves of the right and left progressive-power lenses become identical (2.00 diopter) and the front surfaces have the common shape. As shown in FIG. 60B, however, the astigmatism of the left lens becomes significantly large as compared with the condition before the design change.

The above examples of the conventional single-vision spectacle lenses and the conventional progressive-power spectacle lenses show that the outward appearance and the optical performance are mutually contradictory requirements under the conventional design method when the focal powers required for the right and left lenses are different to each other. That's because the conventional design method only takes the focal powers and the shapes into account.

SUMMARY OF THE INVENTION

It is therefore an object of the present invention to provide improved manufacturing method and system of spectacle lenses, which is capable of manufacturing spectacle lenses that are balanced in an outward appearance and have satisfactory optical performance.

For the above object, according to the present invention, there is provided an improved manufacturing method of spectacle lenses, which includes:

selecting and determining a substantially common shape for front surfaces of right and left lenses among predetermined shapes based on specifications of the right and left lenses;

calculating shape data of back surfaces of the right and left lenses, respectively, on the basis of the specifications and the selected shape of the front surfaces;

processing a back surface of a semifinished lens blank whose front surface is finished with an aspherical surface processing machine controlled based on the shape data of one of the right and left lenses; and processing a back surface of a semifinished lens blank whose front surface is finished with the aspherical surface processing machine based on the shape data of the other lens.

With this method, the manufactured spectacle lenses are balanced in the outward appearance because the front surfaces are substantially identical to each other. Further since the shapes of the back surfaces can be determined so as to reduce aberrations, the manufactured lenses having satisfactory optical performances can be obtained. The "substantially common shape" means that the difference between the front surfaces of the right and left lenses is smaller than the difference between the independently designed lenses. It is desirable that the shapes of the front surfaces are in perfect agreement with each other. However, the outward appearance can be enhanced even if the shapes are slightly different.

The spectacle lenses may be single-vision lenses or progressive-power lenses. When the single-vision lenses are manufactured, the specifications preferably include spherical powers and cylindrical powers of the right and left lenses, respectively. When the progressive-power lenses are manufactured, the specifications preferably include vertex powers of distance portion and addition powers of the right and left lenses, respectively.

The selecting and determining the shape of the front surfaces and the calculating shape data of the back surfaces are preferably implemented via computer program. In such a case, the aspherical surface processing machine is operated under computer control based on the calculated shape data of the back surfaces. Further, the calculating the shape data of the back surfaces may be implemented via computer program with an optimization algorithm so as to reduce aberration while keeping a required focal power.

When the common shape of the front surface is a spherical surface, the processing of the front surface is easy. The common shape may be an intermediate shape between the shapes of the independently designed lenses or may be in agreement with one of the independently designed lenses.

A manufacturing system of spectacle lenses according to the invention includes:

an input device that is employed to input specifications of right and left lenses;

a selecting device for selecting and determining a substantially common shape for front surfaces of the right and left lenses among predetermined shapes based on the specifications;

a calculating device for calculating shape data of back surfaces of the right and left lenses, respectively, on the basis of the specifications and the selected shape of the front surfaces;

an aspherical surface processing machine that process a back surface of a semifinished lens blank; and a controlling device for controlling the aspherical surface processing machine to process the semifinished lens blanks based on the shape data of back surfaces of the right and left lenses.

The selecting device, the calculating device and the controlling device are preferably implemented via computer program.

DESCRIPTION OF THE ACCOMPANYING DRAWINGS

FIG. 20 is a flowchart showing a manufacturing method of progressive-power spectacle lenses according to a second embodiment;

FIGS. 21A and 21B are sectional views of progressive-power lenses according to a fourth comparative example;

FIGS. 22A and 22B are graphs showing variations of surface powers of back surfaces of the right and left lenses of FIGS. 21A and 21B;

FIGS. 23A and 23B are graphs showing variations of "as-worn" powers of the right and left lenses of FIGS. 21A and 21B;

FIGS. 24A and 24B are sectional views of progressive-power lenses according to a first example of the second embodiment;

FIGS. 25A and 25B are graphs showing variations of surface powers of back surfaces of the right and left lenses of FIGS. 24A and 24B;

FIGS. 26A and 26B are graphs showing variations of "as-worn" powers of the right and left lenses of FIGS. 24A and 24B;

FIGS. 31A and 31B are graphs showing variations of surface powers of back surfaces of the right and left lenses of FIGS. 30A and 30B;

FIGS. 32A and 32B are graphs showing variations of "as-worn" powers of the right and left lenses of FIGS. 30A and 30B;

FIGS. 37A and 37B are graphs showing variations of surface powers of back surfaces of the right and left lenses of FIGS. 36A and 36B;

FIGS. 38A and 38B are graphs showing variations of "as-worn" powers of the right and left lenses of FIGS. 36A and 36B;

DESCRIPTION OF THE EMBODIMENTS

Figure 1A:
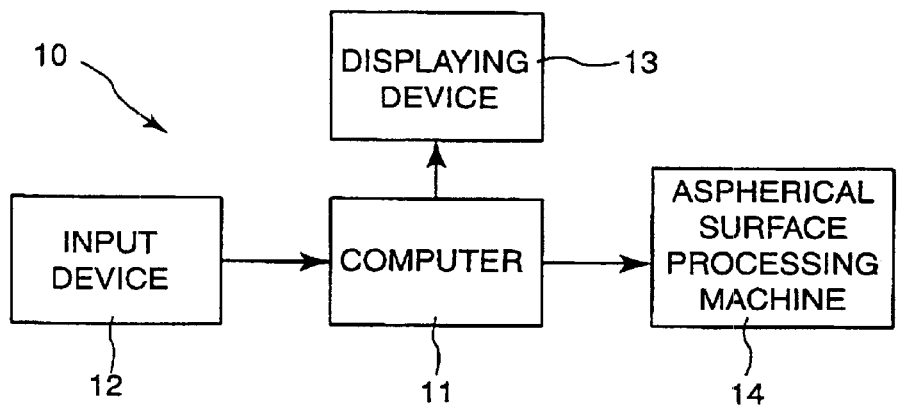
FIG. 1A is a block diagram showing a manufacturing system of spectacle lenses embodying the invention.
Figure 1B:
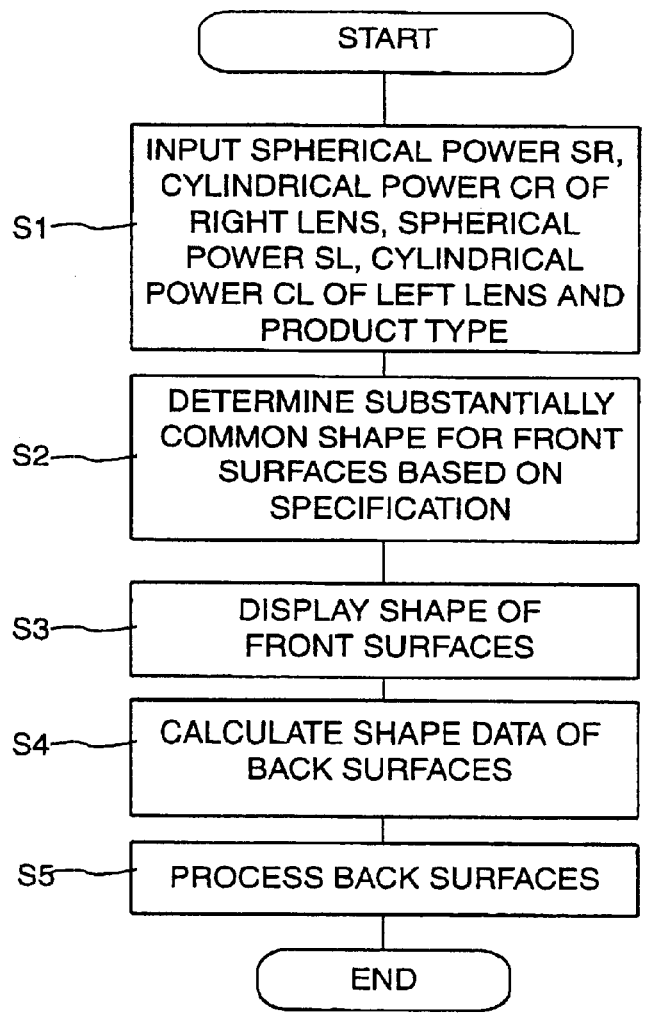
FIG. 1B is a flowchart showing a manufacturing method of single-vision spectacle lenses according to a first embodiment.

Manufacturing method and system of spectacle lenses embodying the invention will be described with reference to the accompanying drawings. FIG. 1A is a block diagram showing the manufacturing system of spectacle lenses that is common for both first and second embodiments. FIG. 1B is a flowchart showing the manufacturing method according to the first embodiment.

As shown in FIG. 1A, the manufacturing system 10 of spectacle lenses is provided with a computer 11 on which a computer program, which functions as a plurality of means (devices) discussed later, is installed, an input device 12 such as a keyboard to input data to the computer 11, a display 13 such as CRT that is connected to the computer 11, and an aspherical surface processing machine 14 that is controlled by the computer 11.

First Embodiment

The manufacturing method of single-vision aspherical lenses according to the first embodiment will be described with reference to the flowchart of FIG. 1B.

When an order from a customer is received, spectacle lenses are manufactured in a manufacturing factory according to steps of FIG. 1B. In step S1, an operator input customer's data (i.e., specifications of the right and left lenses) to the computer 11 with the input device 12. The specifications include spherical powers SR and SL, cylindrical powers CR and CL to correct astigmatism of eyes, and a product type. SR and CR define the right lens, SL and CL define the left lens. The product type means a type of lens material. The customer's data may be input to a terminal computer placed in an opticianry. In such a case, the customer's data is transmitted to the factory through a computer network.

In step S2, the computer 11 selects and determines a substantially common shape for front surfaces of the right and left lenses among predetermined shapes according to a selecting program installed therein. The selected shapes of the front surfaces are indicated on the displaying device 13 in step S3. Semifinished lens blanks whose front surfaces are finished are stockpiled in the manufacturing factory. The front surfaces of the semifinished lens blanks are spherical. There are various types of semifinished lens blanks whose radii of curvature of the front surfaces are different to one another. The selecting program selects a substantially common front surface shape among various types of the semifinished lens blanks based on the input specifications. The selecting program selects the common shape or the substantially common shape. The common shape may be identical to one of the right and left lenses when these lenses are independently designed, or the common shape may stand midway between shapes of the right and left lenses when these lenses are independently designed. Since the front surface of the finished lens is spherical, it is easy to process molding dies for the semifinished lens. Further, since the back surface is processed to be aspherical, a sufficient optical performance can be kept even if the front surface is spherical. That is, it is unnecessary to form the front surface as an aspherical surface.

In step S4, the computer 11 calculates shape data of the back surfaces of the right and left lenses, respectively, on the basis of the specifications and the selected shape of the front surfaces according to a calculating program. The calculating program finds the shape data of the aspherical back surfaces based on the determined shapes of the front surfaces at step S2 with an optimization algorithm such as a damping least squares method so as to reduce aberration while keeping a required focal power.

Further, since the most suitable aspherical shape data of the back surface can be previously calculated and stored corresponding to a specific shape of the front surface at a specific focal power, the shape data of the back surface may be selected among the stored data in place of the calculation in step S4. In such a case, since the front surface can be selected among a plurality of shapes (i.e., semifinished lenses) and each of the shapes of the front surface requires a specific (i.e., unique) shape data of the back surface for a specific focal power, a plurality of shape data of the back surface must be prepared for each focal power.

Next, the operator places the semifinished lens blank whose front surface agrees with the shape indicated on the display device 13 on the aspherical surface processing machine 14. After the placement, when the operator enters a start command from the input device 12, the computer 11 controls the aspherical surface processing machine 14 to process (grind) the back surface of the semifinished lens blank based on the shape data in step S5. Two semifinished lens blanks are placed in sequence to obtain the right and left lenses.

Next, three examples of single-vision spectacle lenses manufactured by the manufacturing method of the first embodiment will be described. In the following description, a comparative example where right and left lenses are independently designed (i.e., front surfaces are different) and an example of the first embodiment where front surfaces have a substantially common shape are described in order. The spectacle lenses of a comparative example have the same focal powers as the corresponding example of the embodiment. Further, the front surfaces are completely identical in the first and second examples of the embodiment, and they are substantially identical but slightly different in the third example of the embodiment.

First Comparative Example

Figures 2A, 2B:
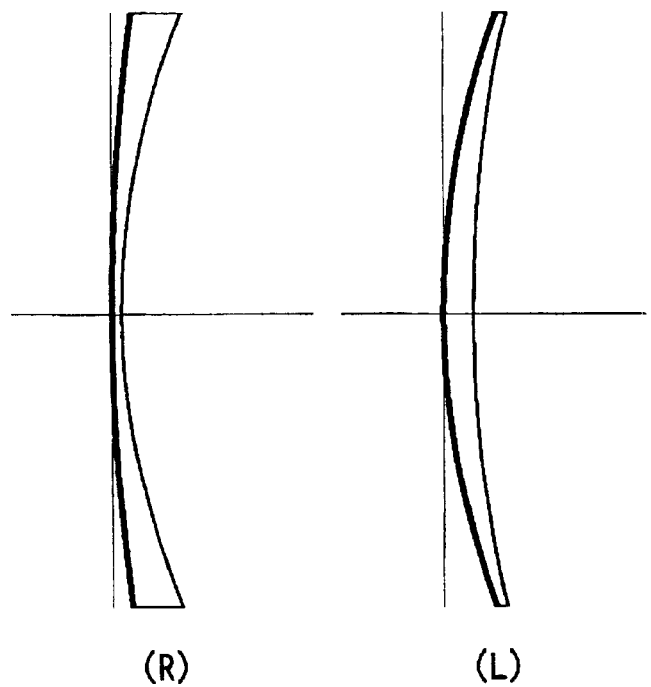
FIGS. 2A and 2B are sectional views of single-vision aspherical lenses according to a first comparative example.

FIGS. 2A and 2B are sectional views of single-vision aspherical lenses according to a first comparative example where right and left lenses are independently designed. In each lens diagram, the surface at the left is a front surface and the surface at the right is a back surface. The front surfaces are spherical surfaces and the back surfaces are rotationally-symmetrical aspherical surfaces. In this example, spherical powers (SPH) required for the right and left lenses are −4.00 diopter and +2.00 diopter, respectively. TABLE 9 shows numerical construction of each lens. In TABLE 9, R1 denotes a radius of curvature of the spherical front surface, R2 denotes a radius of curvature at the center of the aspherical back surface, T denotes a center thickness, N denotes a refractive index and φ denotes a diameter of the semifinished lens blank. Units of R1, R2, T and φ are millimeters (mm).

TABLE 9

|  | (R) | (L) |
|---|---|---|
| SPH | −4.000 | 2.000 |
| R1 | 300.000 | 120.000 |
| R2 | 99.958 | 196.959 |
| T | 1.000 | 2.937 |
| N | 1.600 | 1.600 |
| φ | 70.000 | 70.000 |

Figures 3A, 3B:
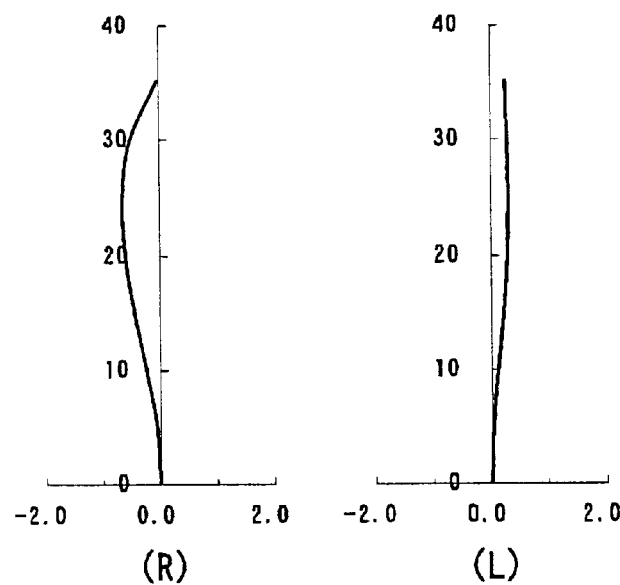
FIGS. 3A and 3B are graphs showing variations of surface powers of back surfaces of the right and left lenses of FIGS. 2A and 2B.
Figures 4A, 4B:
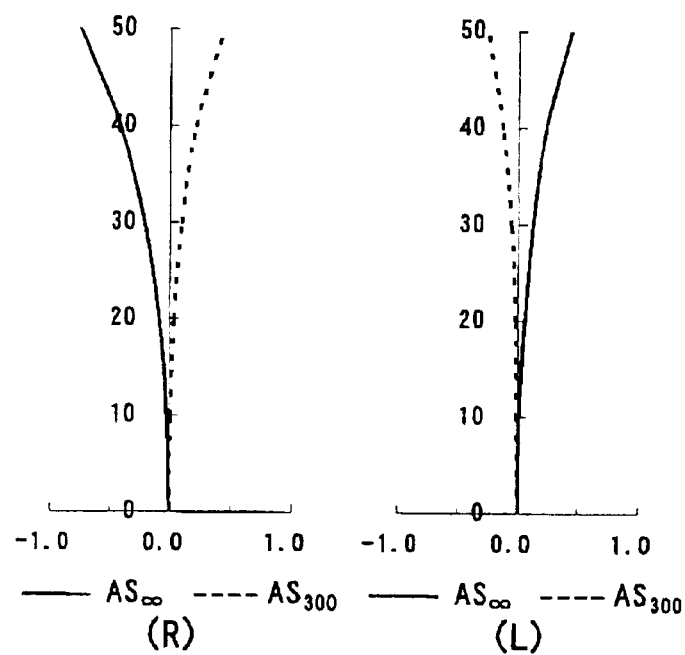
FIGS. 4A and 4B are graphs showing astigmatisms of the right and left lenses of FIGS. 2A and 2B for distance and near visions.

FIGS. 3A and 3B are graphs showing variations of surface powers of the aspherical back surfaces of the right and left lenses. Base curves of the right and left lenses are 2.00 diopter and 5.00 diopter, respectively. FIGS. 4A and 4B are graphs showing astigmatisms of the right and left lenses. FIGS. 3A and 3B the horizontal axis denotes the surface power (unit: diopter) and the vertical axis denotes the distance from the center of the front surface (unit: mm). In FIGS. 4A and 4B the horizontal axis denotes an amount of astigmatism (unit: diopter) and the vertical axis denotes a visual angle (unit: degree). Further, in FIGS. 4A and 4B, a solid line represents the astigmatism $AS_\infty$ for distance vision (object distance: ∞) and a dotted line represents the astigmatism $AS_{300}$ for near vision (object distance: 300 mm). The respective spectacle lenses have satisfactory optical performances, while the outward appearance lacks in balance between the right and left lenses because of the difference between the base curves.

First Example of First Embodiment

Figures 5A, 5B:
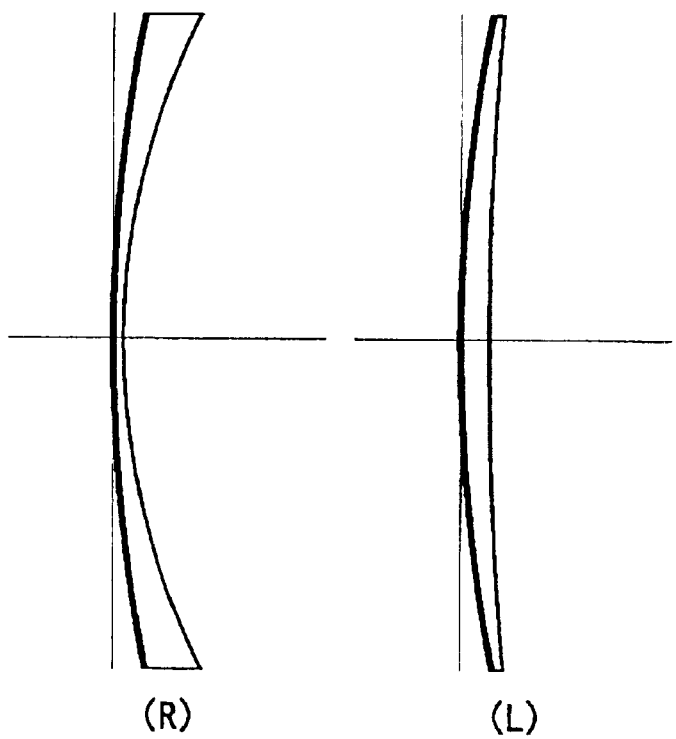
FIGS. 5A and 5B are sectional views of single-vision aspherical lenses according to a first example of the first embodiment.

FIGS. 5A and 5B are sectional views of single-vision aspherical lenses according to a first example of the first embodiment. The focal powers of the lenses of the first example are the same as that of the first comparative example, while the front surfaces of the right and left lenses have a common shape in order to enhance the outward appearance. Further the aspherical shapes of the back surfaces are determined so as to reduce aberrations even when the front surfaces have the common shape. TABLE 10 shows numerical construction of each lens. Base curves of the right and left lenses are 3.00 diopter that is an intermediate value between the base curves of the first comparative example.

TABLE 10

|  | (R) | (L) |
|---|---|---|
| SPH | −4.000 | 2.000 |
| R1 | 200.000 | 200.000 |
| R2 | 85.645 | 590.792 |
| T | 1.000 | 2.757 |
| N | 1.600 | 1.600 |
| φ | 70.000 | 70.000 |

Figures 6A, 6B:
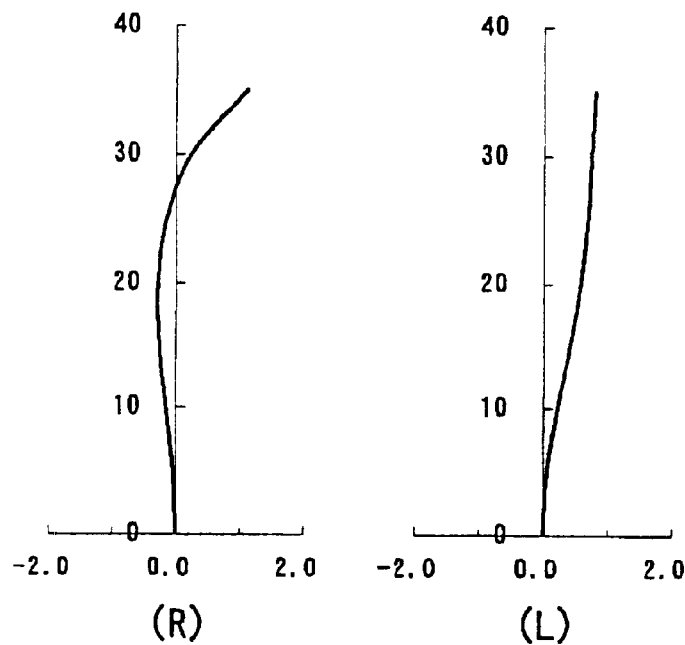
FIGS. 6A and 6B are graphs showing variations of surface powers of back surfaces of the right and left lenses of FIGS. 5A and 5B.
Figures 7A, 7B:
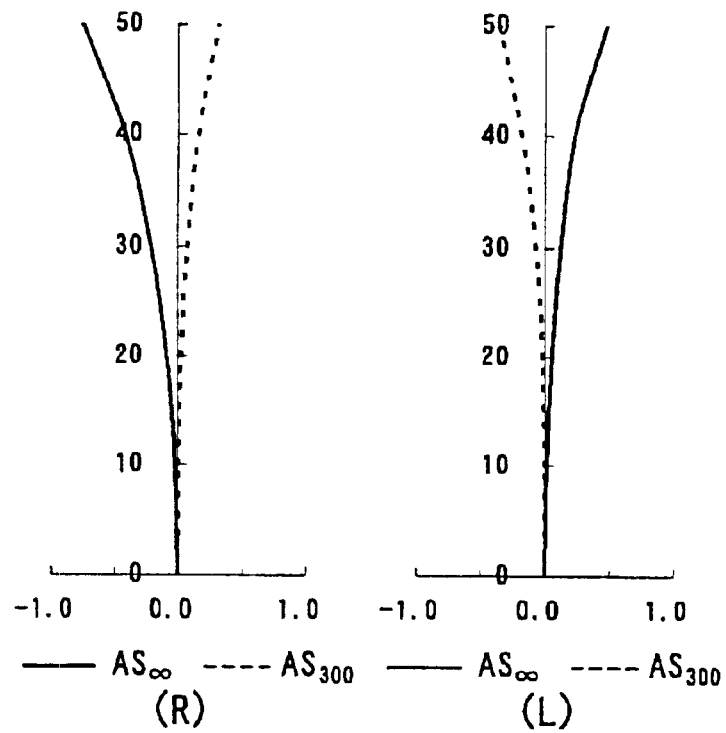
FIGS. 7A and 7B are graphs showing astigmatisms of the right and left lenses of FIGS. 5A and 5B for distance and near visions.

FIGS. 6A and 6B are graphs showing variations of surface powers of the aspherical back surfaces of the right and left lenses. FIGS. 7A and 7B are graphs showing astigmatisms $AS_\infty$ and $AS_{300}$ of the right and left lenses. FIGS. 7A and 7B show that the astigmatisms of the lenses of the first example do not become large as compared with the first comparative example. That is, the spectacle lenses of the first example of the first embodiment are balanced in the outward appearance because the base curves are in perfect agreement with each other, and they have satisfactory optical performance not less than that of independently designed spectacle lenses.

Second Comparative Example

Figures 8A, 8B:
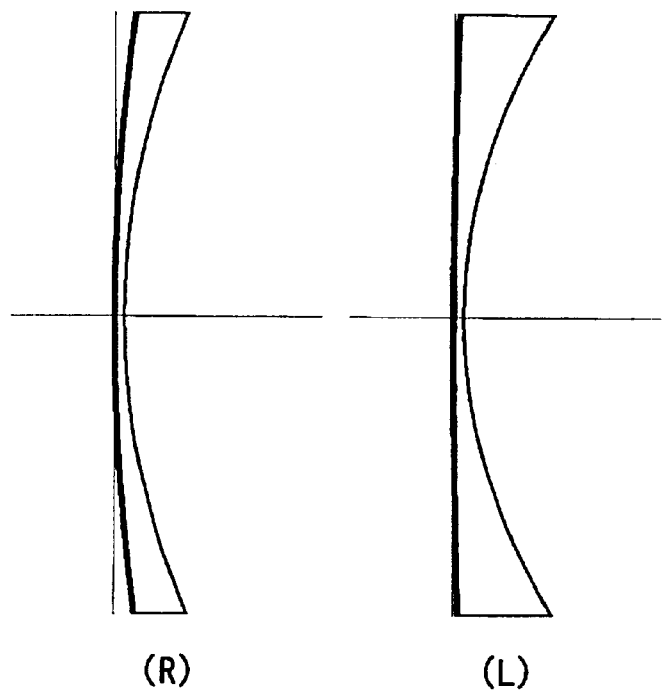
FIGS. 8A and 8B are sectional views of single-vision aspherical lenses according to a second comparative example.

FIGS. 8A and 8B are sectional views of single-vision aspherical lenses according to a second comparative example where right and left lenses are independently designed. The front surfaces are spherical surfaces and the back surfaces are rotationally-symmetrical aspherical surfaces. In this example, SPH required for the right and left lenses are −4.00 diopter and −8.00 diopter, respectively. TABLE 11 shows numerical construction of each lens.

TABLE 11

|  | (R) | (L) |
|---|---|---|
| SPH | −4.000 | −8.000 |
| R1 | 300.000 | 1200.000 |
| R2 | 99.958 | 70.587 |
| T | 1.000 | 1.000 |
| N | 1.600 | 1.600 |
| φ | 70.000 | 70.000 |

Figures 9A, 9B:
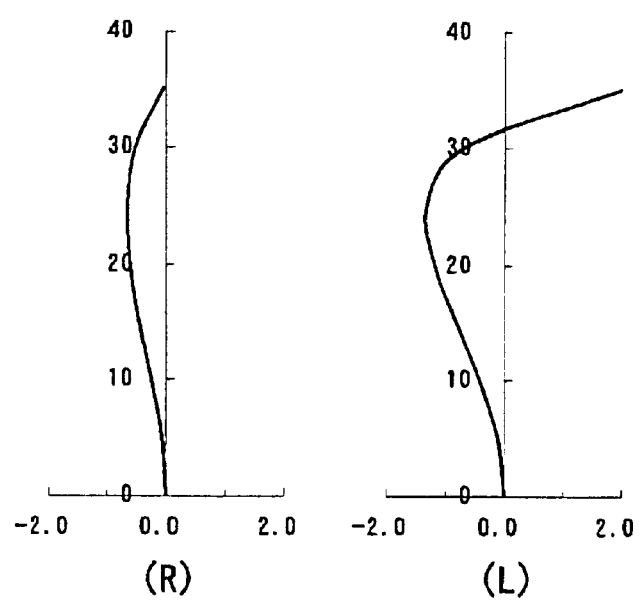
FIGS. 9A and 9B are graphs showing variations of surface powers of back surfaces of the right and left lenses of FIGS. 8A and 8B.
Figures 10A, 10B:
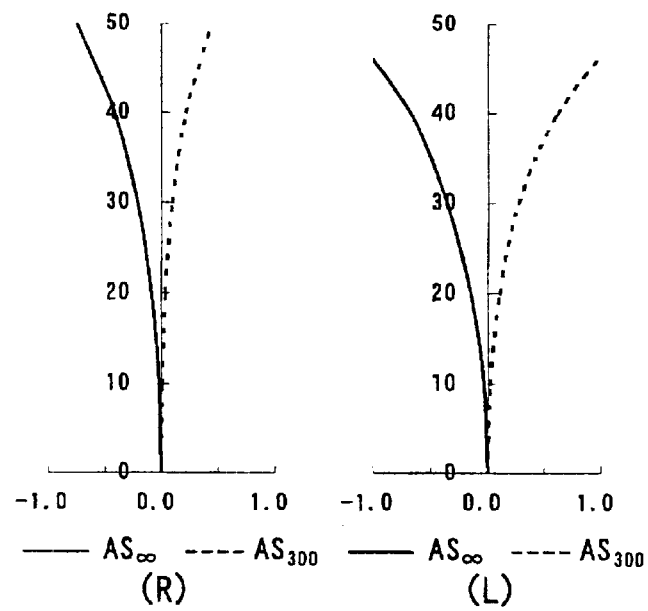
FIGS. 10A and 10B are graphs showing astigmatisms of the right and left lenses of FIGS. 8A and 8B for distance and near visions.

FIGS. 9A and 9B are graphs showing variations of surface powers of the aspherical back surfaces of the right and left lenses. Base curves of the right and left lenses are 2.00 diopter and 0.50 diopter, respectively. FIGS. 10A and 10B are graphs showing astigmatisms $AS_\infty$ for distance vision and the astigmatism $AS_{300}$ for near vision. The respective spectacle lenses have satisfactory optical performances, while the outward appearance lacks in balance between the right and left lenses because of the difference between the base curves.

Second Example of First Embodiment

Figures 11A, 11B:
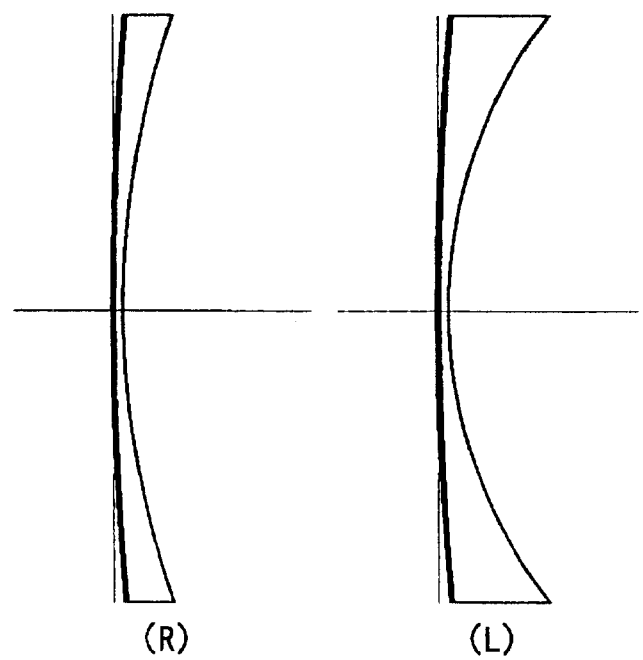
FIGS. 11A and 11B are sectional views of single-vision aspherical lenses according to a second example of the first embodiment.

FIGS. 11A and 11B are sectional views of single-vision aspherical lenses according to a second example of the first embodiment. The focal powers of the lenses of the second example are the same as that of the second comparative example, while the front surfaces of the right and left lenses have a common shape in order to enhance the outward appearance. Further the aspherical shapes of the back surfaces are determined so as to reduce aberrations even when the front surfaces have the common shape. TABLE 12 shows numerical construction of each lens. Base curves of the right and left lenses are 1.25 diopter that is an intermediate value between the base curves of the second comparative example.

TABLE 12

|  | (R) | (L) |
|---|---|---|
| SPH | −4.000 | −8.000 |
| R1 | 480.000 | 480.000 |
| R2 | 114.264 | 64.858 |
| T | 1.000 | 1.000 |
| N | 1.600 | 1.600 |
| φ | 70.000 | 70.000 |

Figures 12A, 12B:
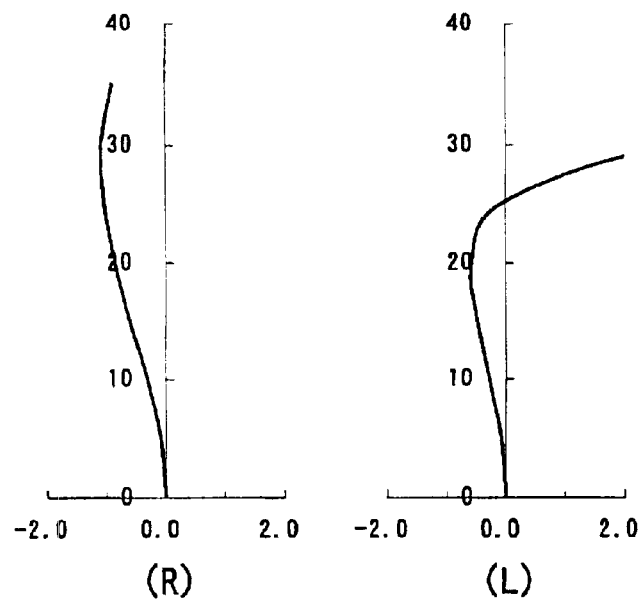
FIGS. 12A and 12B are graphs showing variations of surface powers of back surfaces of the right and left lenses of FIGS. 11A and 11B.
Figures 13A, 13B:
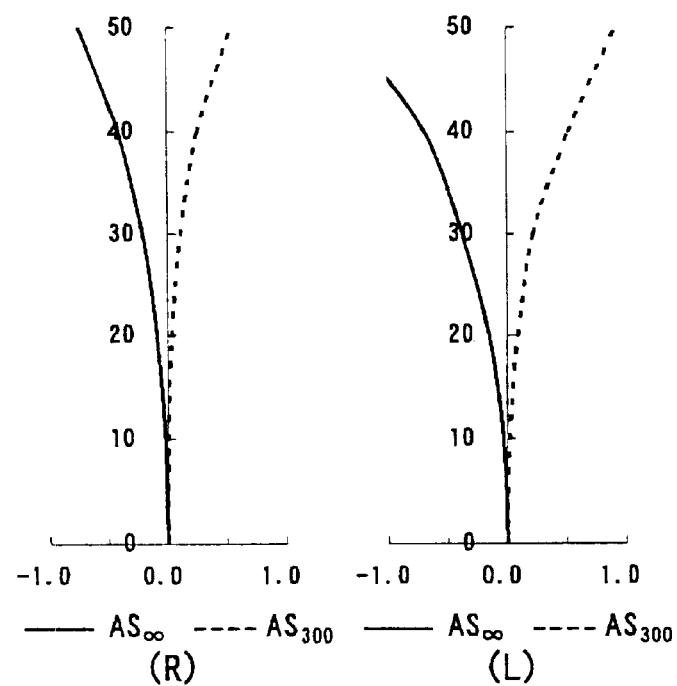
FIGS. 13A and 13B are graphs showing astigmatisms of the right and left lenses of FIGS. 11A and 11B for distance and near visions.

FIGS. 12A and 12B are graphs showing variations of surface powers of the aspherical back surfaces of the right and left lenses. FIGS. 13A and 13B are graphs showing astigmatisms $AS_\infty$ and $AS_{300}$ of the right and left lenses.

FIGS. 13A and 13B show that the astigmatisms of the lenses of the second example do not become large as compared with the second comparative example. That is, the spectacle lenses of the second example of the first embodiment are balanced in the outward appearance because the base curves are in perfect agreement with each other, and they have satisfactory optical performance not less than that of independently designed spectacle lenses.

Third Comparative Example

Figures 14A, 14B:
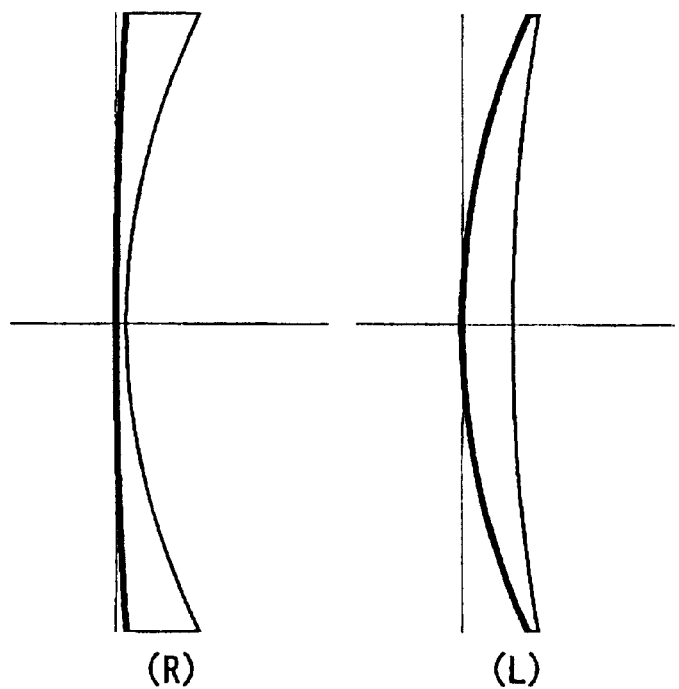
FIGS. 14A and 14B are sectional views of single-vision aspherical lenses according to a third comparative example.

FIGS. 14A and 14B are sectional views of single-vision aspherical lenses according to a third comparative example where right and left lenses are independently designed. The front surfaces are spherical surfaces and the back surfaces are rotationally-symmetrical aspherical surfaces. In this example, SPH required for the right and left lenses are −6.00 diopter and +4.00 diopter, respectively. TABLE 13 shows numerical construction of each lens.

TABLE 13

|     | (R)     | (L)      |
|-----|---------|----------|
| SPH | −6.000  | 4.000    |
| R1  | 600.000 | 100.000  |
| R2  | 85.707  | 284.249  |
| T   | 1.000   | 4.836    |
| N   | 1.600   | 1.600    |
| φ   | 70.000  | 70.000   |

Figures 15A, 15B:
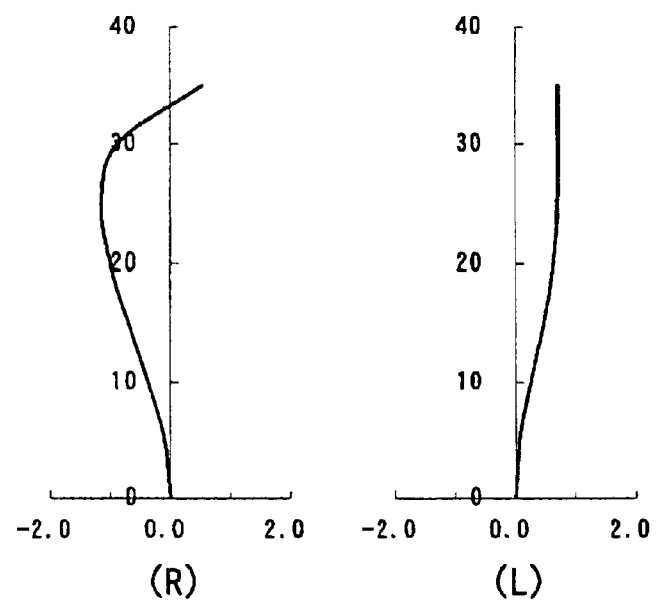
FIGS. 15A and 15B are graphs showing variations of surface powers of back surfaces of the right and left lenses of FIGS. 14A and 14B.
Figures 16A, 16B:
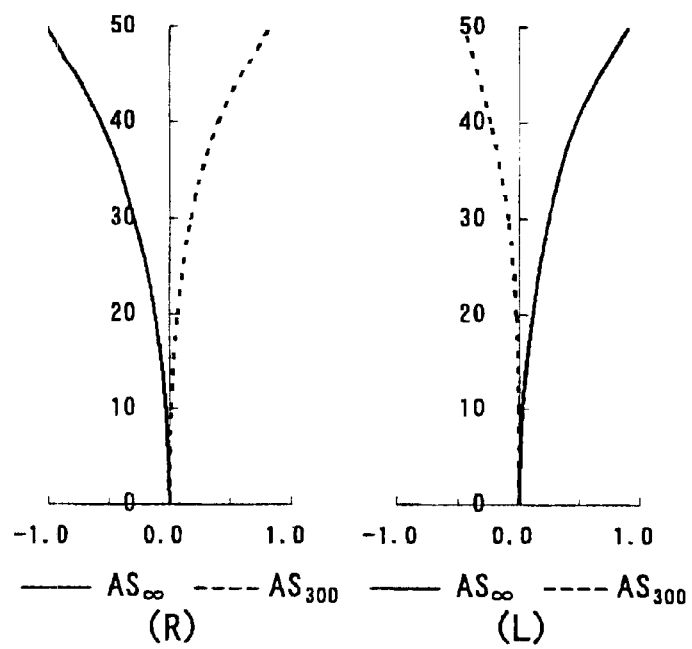
FIGS. 16A and 16B are graphs showing astigmatisms of the right and left lenses of FIGS. 14A and 14B for distance and near visions.

FIGS. 15A and 15B are graphs showing variations of surface powers of the aspherical back surfaces of the right and left lenses. Base curves of the right and left lenses are 1.00 diopter and 6.00 diopter, respectively. FIGS. 16A and 16B are graphs showing astigmatisms $AS_\infty$ for distance vision and the astigmatism $AS_{300}$ for near vision. The respective spectacle lenses have satisfactory optical performances, while the outward appearance lacks in balance between the right and left lenses because of the difference between the base curves.

Third Example of First Embodiment

Figures 17A, 17B:
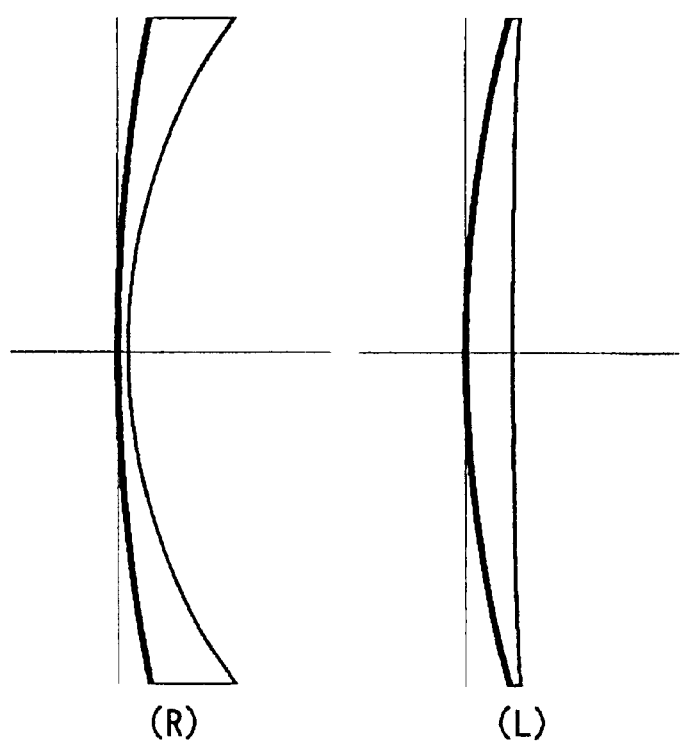
FIGS. 17A and 17B are sectional views of single-vision aspherical lenses according to a third example of the first embodiment.

FIGS. 17A and 17B are sectional views of single-vision aspherical lenses according to a third example of the first embodiment. The focal powers of the lenses of the third example are the same as that of the third comparative example, while the front surfaces of the right and left lenses have a substantially common shape in order to enhance the outward appearance. Further the aspherical shapes of the back surfaces are determined so as to reduce aberrations even when the front surfaces have the substantially common shape. TABLE 14 shows numerical construction of each lens.

TABLE 14

|     | (R)     | (L)        |
|-----|---------|------------|
| SPH | −6.000  | 4.000      |
| R1  | 200.000 | 150.000    |
| R2  | 66.625  | 13171.757  |
| T   | 1.000   | 4.504      |
| N   | 1.600   | 1.600      |
| φ   | 70.000  | 70.000     |

If the base curves of the right and left lenses are completely identical at 3.50 diopter that is an intermediate value between the base curves of the third comparative example, the curvature of the back surface of the right lens becomes too large and the back surface of the left lens becomes convex, which increases difficulty of processing. Therefore, in the third example of the first embodiment, the base curves are substantially identical but slightly different to enhance the outward appearance while keeping the ease of processing. The base curves of the right and left lenses are 3.00 diopter and 4.00 diopter, respectively.

Figures 18A, 18B:
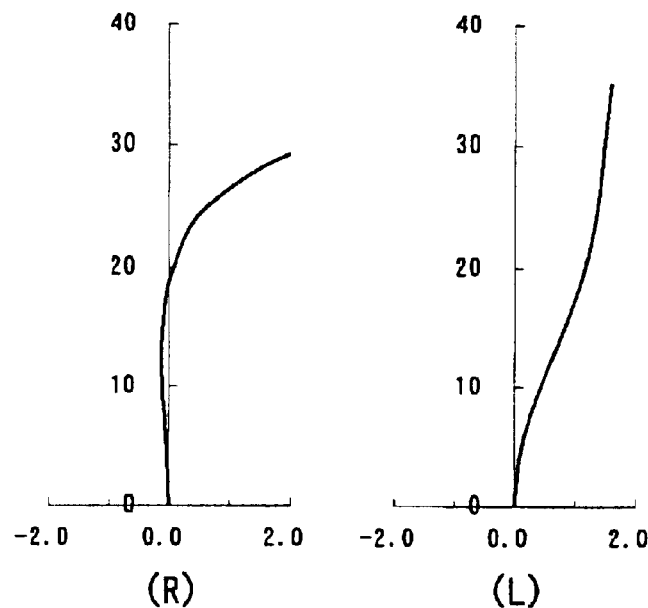
FIGS. 18A and 18B are graphs showing variations of surface powers of back surfaces of the right and left lenses of FIGS. 17A and 17B.
Figures 19A, 19B:
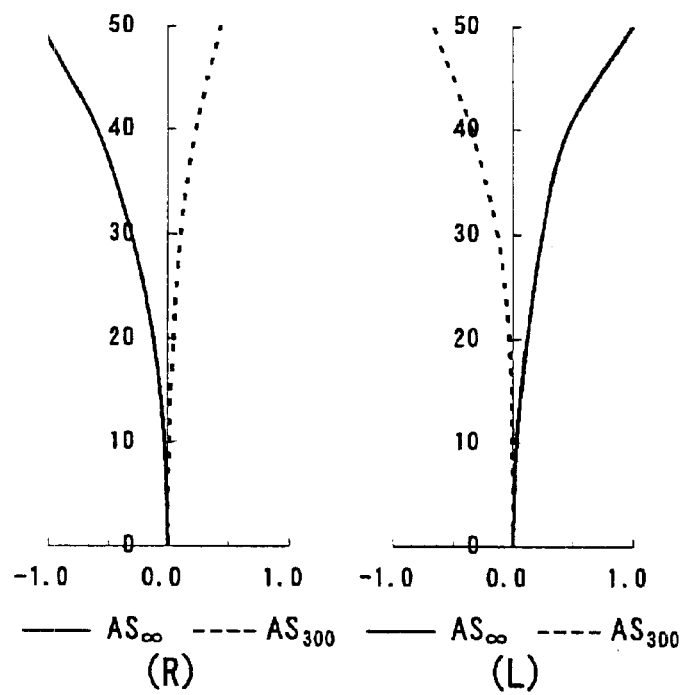
FIGS. 19A and 19B are graphs showing astigmatisms of the right and left lenses of FIGS. 17A and 17B for distance and near visions.

FIGS. 18A and 18B are graphs showing variations of surface powers of the aspherical back surfaces of the right and left lenses. FIGS. 19A and 19B are graphs showing astigmatisms $AS_\infty$ and $AS_{300}$ of the right and left lenses. FIGS. 19A and 19B show that the astigmatisms of the lenses of the third example do not become large as compared with the third comparative example. That is, the spectacle lenses of the third example of the first embodiment are balanced in the outward appearance because the base curves are in close agreement with each other, and they have satisfactory optical performance not less than that of independently designed spectacle lenses.

Second Embodiment

The manufacturing method of progressive-power lenses according to the second embodiment will be described with reference to the flowchart of FIG. 20. The manufacturing system of FIG. 1A is also used in the second embodiment.

In step S11, an operator input customer's data (i.e., specifications of the right and left lenses) to the computer 11 with the input device 12. The specifications include spherical powers SR and SL, cylindrical powers CR and CL, cylinder axis AXR and AXL, addition powers ADR and ADL of the right and left lenses, respectively, and a product type. SR, CR, AXR and ADR define the right lens, SL, CL, AXL and ADL define the left lens.

In step S12, the computer 11 selects and determines a substantially common shape for front surfaces of the right and left lenses among predetermined shapes according to a selecting program installed therein. The selected shapes of the front surfaces are indicated on the displaying device 13 in step S13. Semifinished lens blanks whose front surfaces are finished are stockpiled in the manufacturing factory. The front surfaces of the semifinished lens blanks are spherical. The selecting program selects the common shape that stands midway between shapes of the front surfaces of the right and left lenses when these lenses are independently designed.

In step S14, the computer 11 calculates shape data of the back surfaces of the right and left progressive-power lenses, respectively, on the basis of the specifications and the selected shape of the front surfaces according to a calculating program. The calculating program finds the shape data of the progressive-power back surfaces based on the determined shapes of the front surfaces at step S12 with an optimization algorithm such as a damping least squares method so as to reduce aberration while keeping a required focal power.

Next, the operator places the semifinished lens blank whose front surface agrees with the shape indicated on the display device 13 on the aspherical surface processing machine 14. After the placement, when the operator enters a start command from the input device 12, the computer 11 controls the aspherical surface processing machine 14 to process (grind) the back surface of the semifinished lens blank based on the shape data in step S15. Two semifinished lens blanks are placed in sequence to obtain the right and left progressive-power lenses.

Next, three examples of progressive-power spectacle lenses manufactured by the manufacturing method of the second embodiment will be described. In the following description, a comparative example where right and left lenses are independently designed (i.e., front surfaces are different) and an example of the second embodiment where front surfaces have a substantially common shape are described in order. The spectacle lenses of a comparative example have the same focal powers as the corresponding example of the embodiment. Further, the front surfaces are completely identical in the first and second examples of the embodiment, and they are substantially identical but slightly different in the third example of the embodiment.

Forth Comparative Example

FIGS. 21A and 21B are sectional views of progressive-power lenses according to a fourth comparative example that are independently designed by the aspherical design method. The front surfaces are spherical surfaces and the back surfaces are progressive-power surfaces. In this example, spherical powers (SPH) at a distance portion required for the right and left lenses are −4.00 diopter and +2.00 diopter, respectively. An addition power (ADD) is 2.00 diopter for both of the right and left lenses. TABLE 15 shows numerical construction of each lens. In TABLE 15, D1 denotes a surface power of the front surface, D2 denotes a surface power of the back surface at the distance portion. Units of D1 and D2 are diopter.

TABLE 15

|  | (R) | (L) |
|---|---|---|
| SPH | −4.00 | 2.00 |
| ADD | 2.00 | 2.00 |
| D1 | 2.00 | 5.00 |
| D2* | 6.00 | 3.00 |
| T | 1.29 | 3.67 |
| N | 1.60 | 1.60 |
| φ | 70.00 | 70.00 |

FIGS. 22A and 22B are graphs showing variations of surface powers of the progressive-power back surfaces of the right and left lenses. In the graphs, a solid line represents the surface power DM in a vertical direction along the main meridian and a dotted line represents the surface power DS in a horizontal direction. Base curves (surface power of front surface) of the right and left lenses are 2.00 diopter and 5.00 diopter, respectively.

FIGS. 23A and 23B are graphs showing variations of "as-worn" powers of the right and left lenses. The horizontal axis denotes the "as-worn" power (unit: diopter) and the vertical axis denotes the distance from the center of the front surface (unit: mm). In the graphs, a solid line represents the as-worn power PM in a vertical plane along the main meridian and a dotted line represents the "as-worn" power PS in a horizontal direction.

There are some surface astigmatisms (i.e., difference between DM and DS) as shown in FIGS. 22A and 22B, while astigmatisms (i.e., difference between PM and PS) are corrected as shown in FIGS. 23A and 23B.

The respective spectacle lenses have satisfactory optical performances, while the outward appearance lacks in balance between the right and left lenses because of the difference between the base curves.

First Example of Second Embodiment

FIGS. 24A and 24B are sectional views of progressive-power lenses according to a first example of the second embodiment. The focal powers of the lenses of the first example are the same as that of the fourth comparative example, while the front surfaces of the right and left lenses have a common shape in order to enhance the outward appearance. Further the shapes of the progressive-power back surfaces are determined so as to reduce aberrations even when the front surfaces have the common shape. TABLE 16 shows numerical construction of each lens. Base curves of the right and left lenses are 4.00 diopter that is an intermediate value between the base curves of the fourth comparative example.

TABLE 16

|  | (R) | (L) |
|---|---|---|
| SPH | −4.00 | 2.00 |
| ADD | 2.00 | 2.00 |
| D1 | 4.00 | 4.00 |
| D2* | 8.00 | 2.00 |
| T | 1.28 | 3.59 |
| N | 1.60 | 1.60 |
| φ | 70.00 | 70.00 |

FIGS. 25A and 25B are graphs showing variations of surface powers DM and DS of the progressive-power back surfaces of the right and left lenses. FIGS. 26A and 26B are graphs showing variations of "as-worn" powers PM and PS of the right and left lenses. The astigmatisms of the lenses of the first example substantially equal to that of the fourth comparative example. That is, the spectacle lenses of the first example of the second embodiment are balanced in the outward appearance because the base curves are in perfect agreement with each other, and they have satisfactory optical performance not less than that of independently designed spectacle lenses.

Fifth Comparative Example

Figures 27A, 27B:
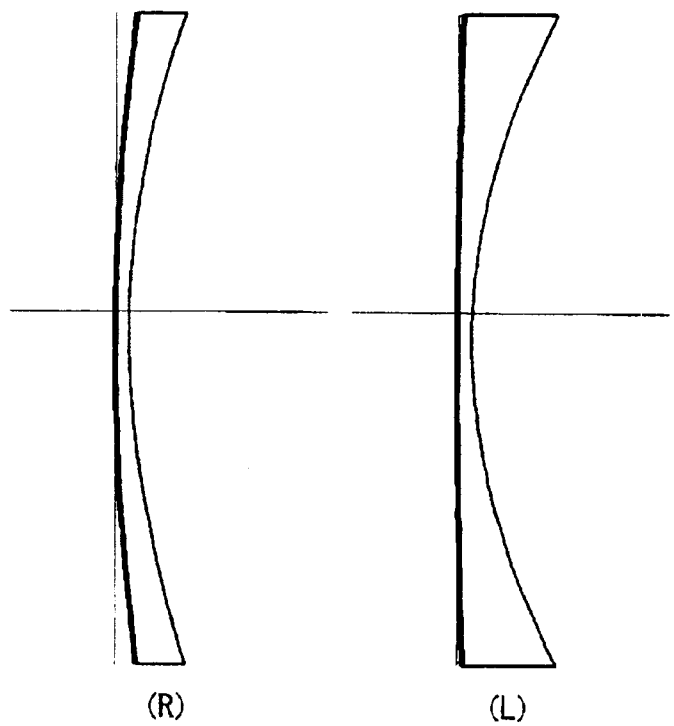
FIGS. 27A and 27B are sectional views of progressive-power lenses according to a fifth comparative example.

FIGS. 27A and 27B are sectional views of progressive-power lenses according to a fifth comparative example that are independently designed by the aspherical design method. The front surfaces are spherical surfaces and the back surfaces are progressive-power surfaces. In this example, SPH required for the right and left lenses are −4.00 diopter and −8.00 diopter, respectively. ADD is 2.00 diopter for both of the right and left lenses. TABLE 17 shows numerical construction of each lens.

TABLE 17

|  | (R) | (L) |
|---|---|---|
| SPH | −4.00 | −8.00 |
| ADD | 2.00 | 2.00 |
| D1 | 2.00 | 0.50 |
| D2* | 6.00 | 8.50 |
| T | 1.29 | 1.34 |
| N | 1.60 | 1.60 |
| φ | 70.00 | 70.00 |

Figures 28A, 28B:
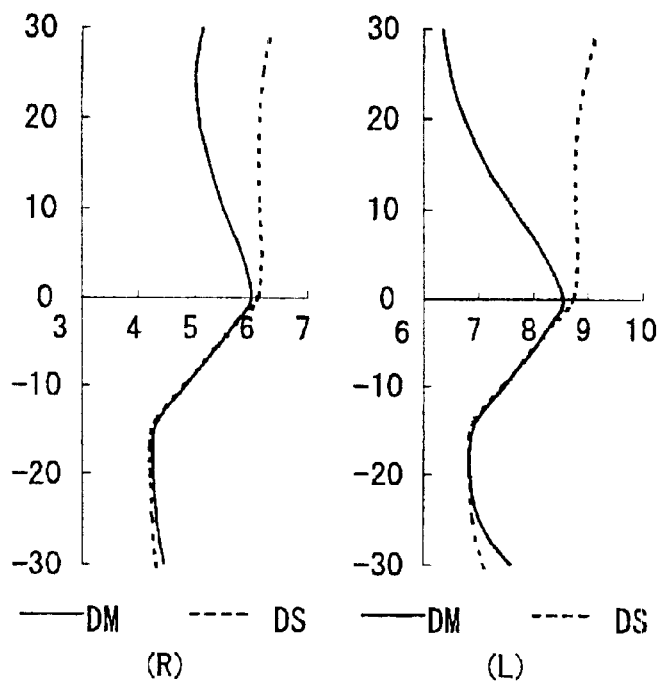
FIGS. 28A and 28B are graphs showing variations of surface powers of back surfaces of the right and left lenses of FIGS. 27A and 27B.
Figures 29A, 29B:
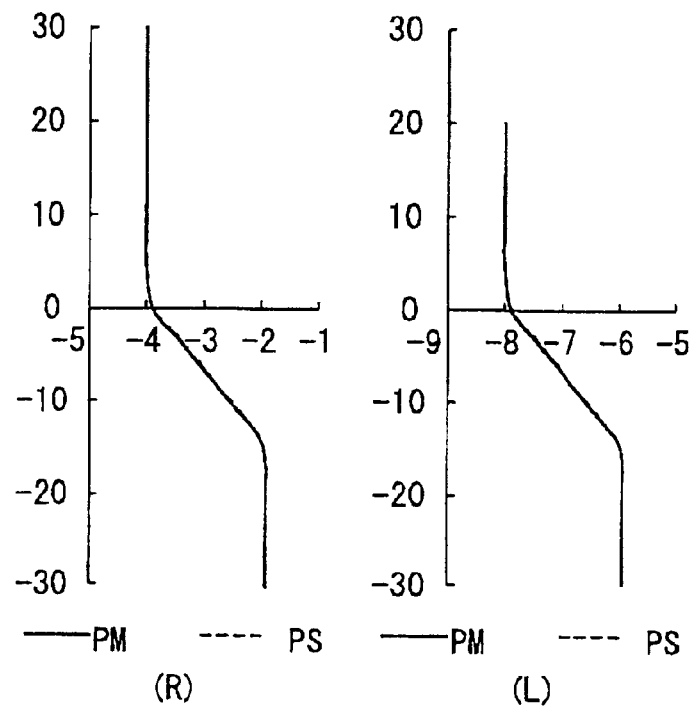
FIGS. 29A and 29B are graphs showing variations of "as-worn" powers of the right and left lenses of FIGS. 27A and 27B.

FIGS. 28A and 28B are graphs showing variations of surface powers DM and DS of the progressive-power back surfaces of the right and left lenses. Base curves of the right and left lenses are 2.00 diopter and 0.50 diopter, respectively. FIGS. 29A and 29B are graphs showing variations of "as-worn" powers PM and PS of the right and left lenses.

There are some surface astigmatisms as shown in FIGS. 28A and 28B, while astigmatisms are corrected as shown in FIGS. 29A and 29B. The respective spectacle lenses have satisfactory optical performances, while the outward appearance lacks in balance between the right and left lenses because of the difference between the base curves.

Second Example of Second Embodiment

Figures 30A, 30B:
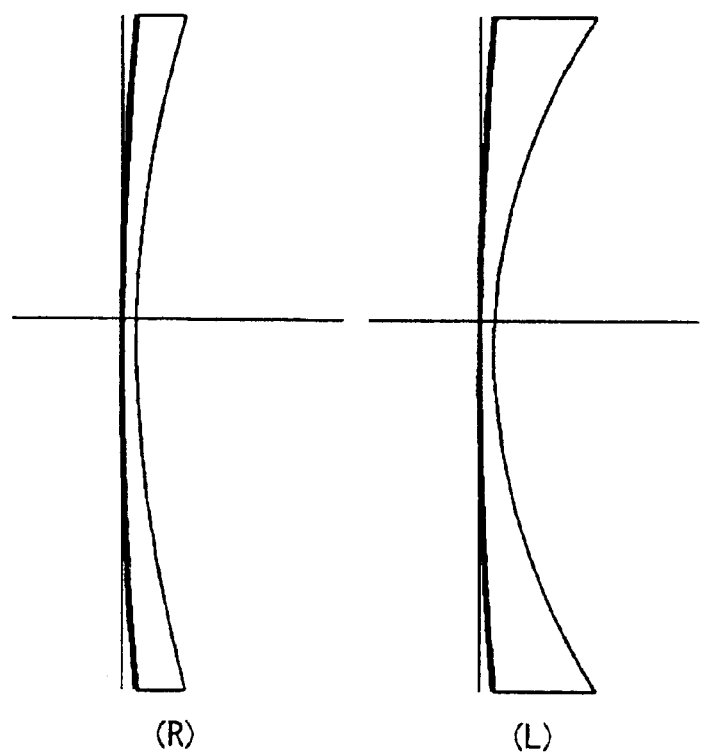
FIGS. 30A and 30B are sectional views of progressive-power lenses according to a second example of the second embodiment.

FIGS. 30A and 30B are sectional views of progressive-power lenses according to a second example of the second embodiment. The focal powers of the lenses of the first example are the same as that of the second comparative example, while the front surfaces of the right and left lenses have a common shape in order to enhance the outward appearance. Further the shapes of the progressive-power back surfaces are determined so as to reduce aberrations even when the front surfaces have the common shape. TABLE 18 shows numerical construction of each lens. Base curves of the right and left lenses are 1.25 diopter that is an intermediate value between the base curves of the fifth comparative example.

TABLE 18

|      | (R)    | (L)    |
|------|--------|--------|
| SPH  | −4.00  | −8.00  |
| ADD  | 2.00   | 2.00   |
| D1   | 1.25   | 1.25   |
| D2*  | 5.25   | 9.25   |
| T    | 1.29   | 1.34   |
| N    | 1.60   | 1.60   |
| φ    | 70.00  | 70.00  |

FIGS. 31A and 31B are graphs showing variations of surface powers DM and DS of the progressive-power back surfaces of the right and left lenses. FIGS. 32A and 32B are graphs showing variations of "as-worn" powers PM and PS of the right and left lenses. The astigmatisms of the lenses of the second example substantially equal to that of the fifth comparative example. That is, the spectacle lenses of the second example of the second embodiment are balanced in the outward appearance because the base curves are in perfect agreement with each other, and they have satisfactory optical performance not less than that of independently designed spectacle lenses.

Sixth Comparative Example

Figures 33A, 33B:
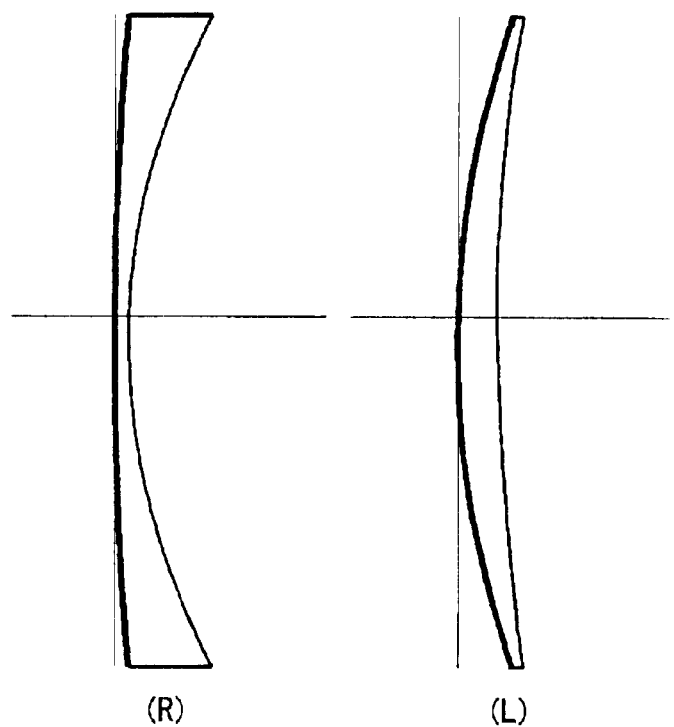
FIGS. 33A and 33B are sectional views of progressive-power lenses according to a sixth comparative example.

FIGS. 33A and 33B are sectional views of progressive-power lenses according to a sixth comparative example that are independently designed by the aspherical design method. The front surfaces are spherical surfaces and the back surfaces are progressive-power surfaces. In this example, SPH required for the right and left lenses are −7.00 diopter and +2.00 diopter, respectively. ADD is 2.00 diopter for both of the right and left lenses. TABLE 19 shows numerical construction of each lens.

TABLE 19

|      | (R)    | (L)    |
|------|--------|--------|
| SPH  | −7.00  | 2.00   |
| ADD  | 2.00   | 2.00   |
| D1   | 1.25   | 5.00   |
| D2*  | 8.25   | 3.00   |
| T    | 1.33   | 3.67   |
| N    | 1.60   | 1.60   |
| φ    | 70.00  | 70.00  |

Figures 34A, 34B:
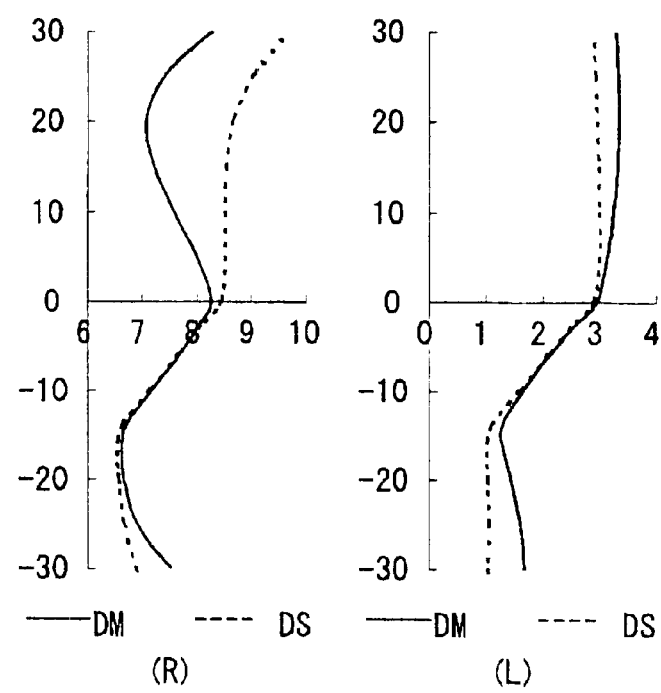
FIGS. 34A and 34B are graphs showing variations of surface powers of back surfaces of the right and left lenses of FIGS. 33A and 33B.
Figures 35A, 35B:
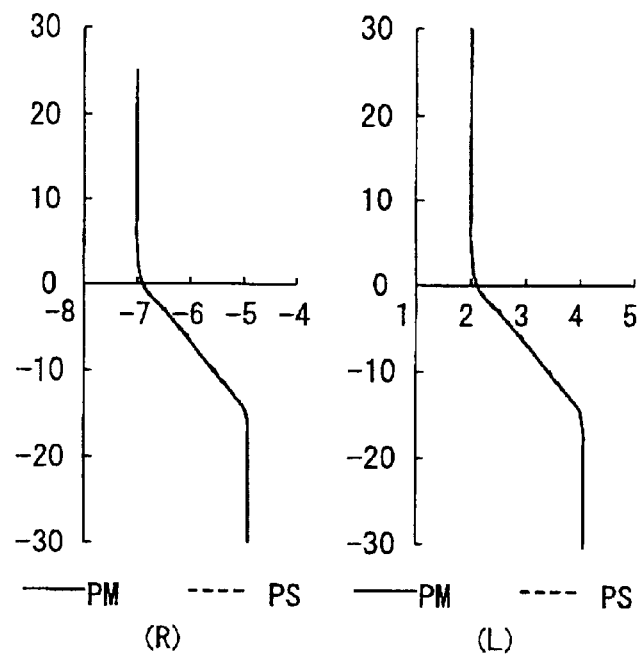
FIGS. 35A and 35B are graphs showing variations of "as-worn" powers of the right and left lenses of FIGS. 33A and 33B.

FIGS. 34A and 34B are graphs showing variations of surface powers DM and DS of the progressive-power back surfaces of the right and left lenses. Base curves of the right and left lenses are 1.25 diopter and 5.00 diopter, respectively. FIGS. 35A and 35B are graphs showing variations of "as-worn" powers PM and PS of the right and left lenses.

There are some surface astigmatisms as shown in FIGS. 34A and 34B, while astigmatisms are corrected as shown in FIGS. 35A and 35B. The respective spectacle lenses have satisfactory optical performances, while the outward appearance lacks in balance between the right and left lenses because of the difference between the base curves.

Third Example of Second Embodiment

Figures 36A, 36B:
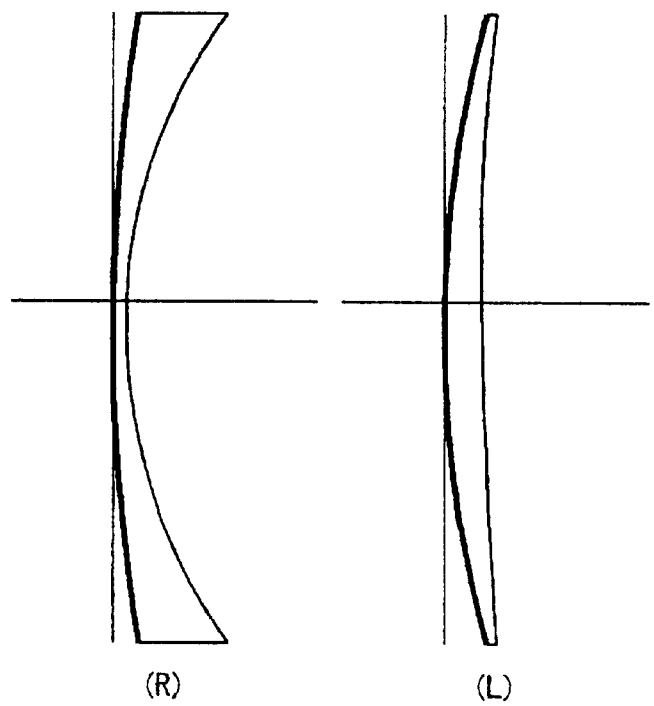
FIGS. 36A and 36B are sectional views of progressive-power lenses according to a third example of the second embodiment.
Figures 39A, 39B:
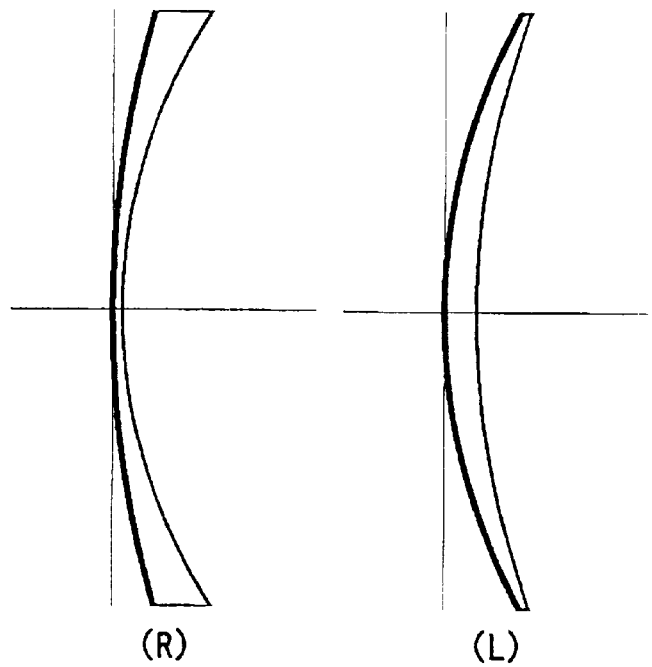
FIGS. 39A and 39B are sectional views of conventional single-vision spherical lenses when right and left lenses are independently designed.
Figures 40A, 40B:
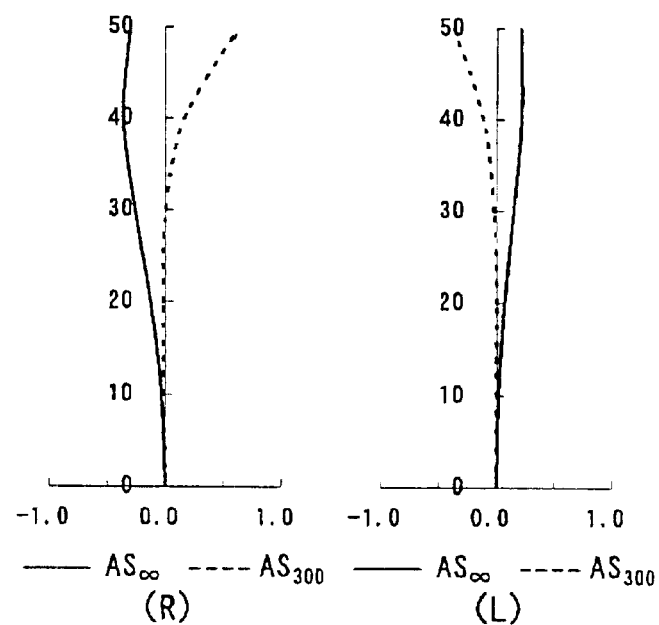
FIGS. 40A and 40B are graphs showing astigmatisms of the right and left lenses of FIGS. 39A and 39B.
Figures 41A, 41B:
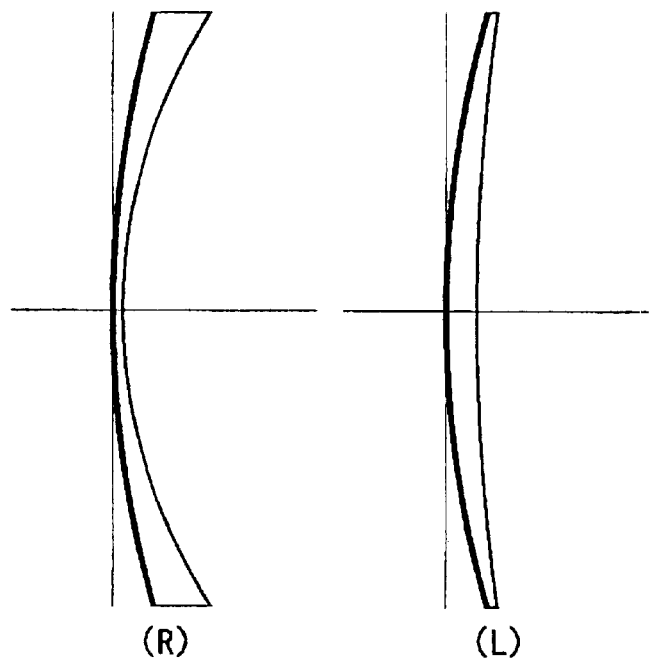
FIGS. 41A and 41B are sectional views of the right and left lenses after the lenses of FIGS. 39A and 39B are redesigned such that the front surfaces have common shapes.
Figures 42A, 42B:
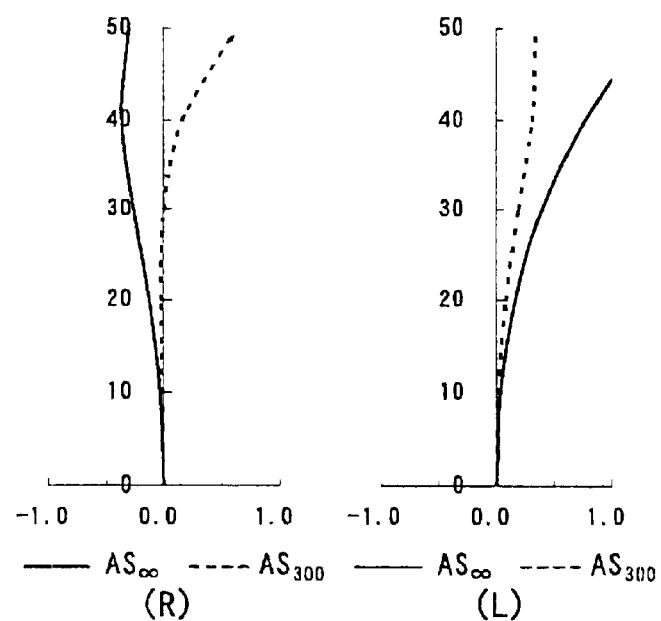
FIGS. 42A and 42B are graphs showing astigmatisms of the right and left lenses of FIGS. 41A and 41B.
Figures 43A, 43B:
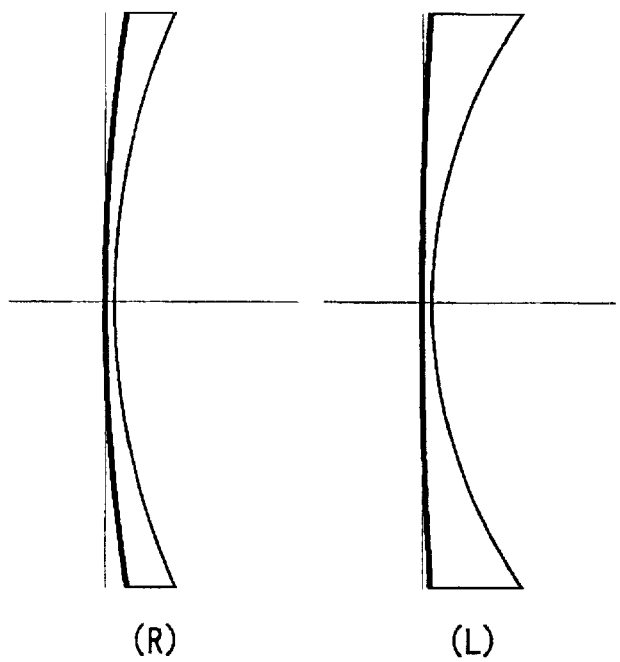
FIGS. 43A and 43B are sectional views of conventional single-vision aspherical lenses when right and left lenses are independently designed.
Figures 44A, 44B:
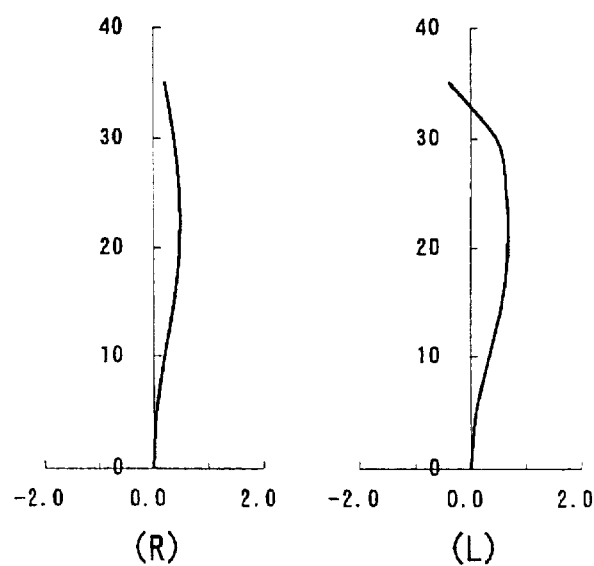
FIGS. 44A and 44B are graphs showing variations of surface powers of front surfaces of the right and left lenses of FIGS. 43A and 43B.
Figures 45A, 45B:
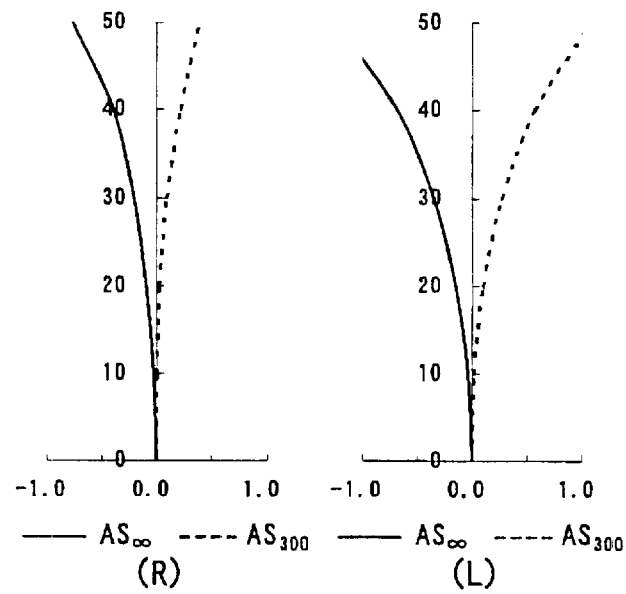
FIGS. 45A and 45B are graphs showing astigmatisms of the right and left lenses of FIGS. 43A and 43B.
Figures 46A, 46B:
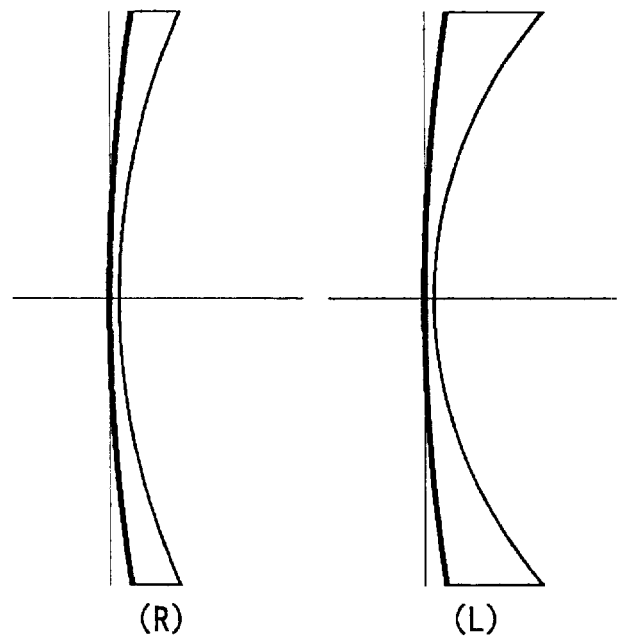
FIGS. 46A and 46B are sectional views of the right and left lenses after the lenses of FIGS. 43A and 43B are redesigned such that the front surfaces have common shapes.
Figures 47A, 47B:
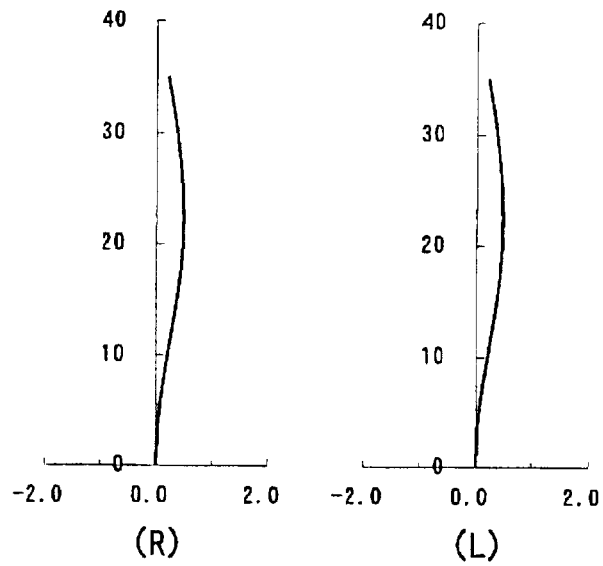
FIGS. 47A and 47B are graphs showing variations of surface powers of front surfaces of the right and left lenses of FIGS. 46A and 46B.
Figures 48A, 48B:
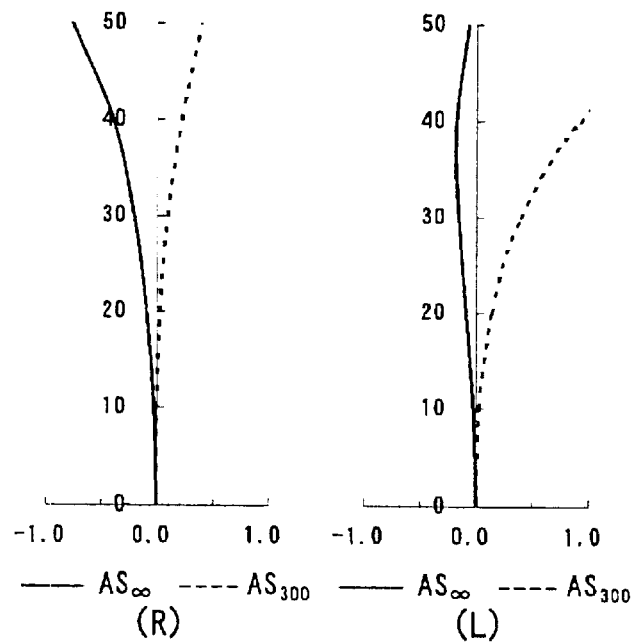
FIGS. 48A and 48B are graphs showing astigmatisms of the right and left lenses of FIGS. 46A and 46B.
Figures 49A, 49B:
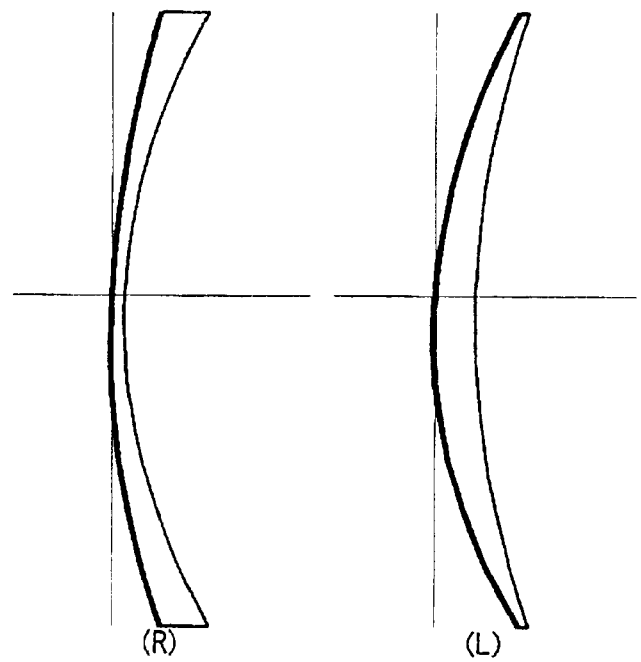
FIGS. 49A and 49B are sectional views of conventional progressive-power lenses that are independently designed through a spherical design method.
Figures 50A, 50B:
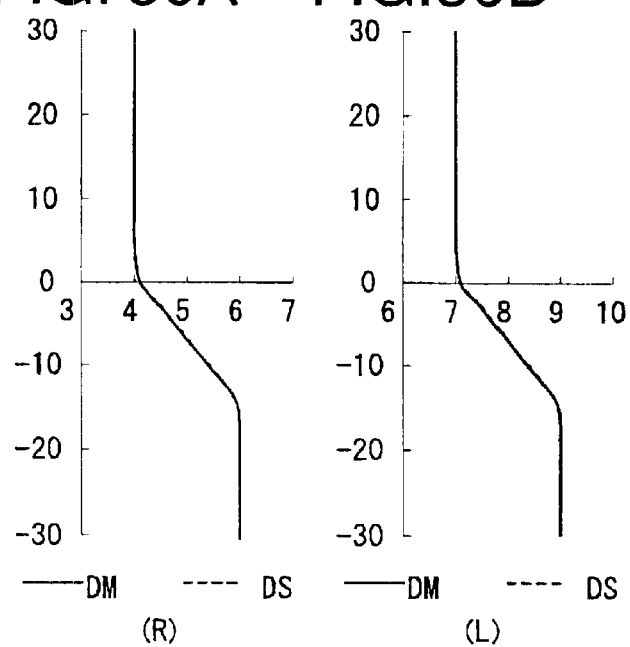
FIGS. 50A and 50B are graphs showing variations of surface powers of front surfaces of the right and left lenses of FIGS. 49A and 49B.
Figures 51A, 51B:
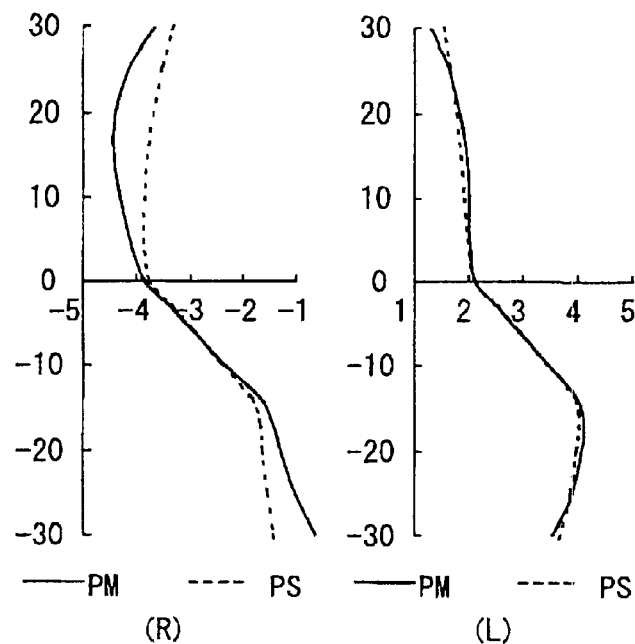
FIGS. 51A and 51B are graphs showing variations of "as-worn" powers of the right and left lenses of FIGS. 49A and 49B.
Figures 52A, 52B:
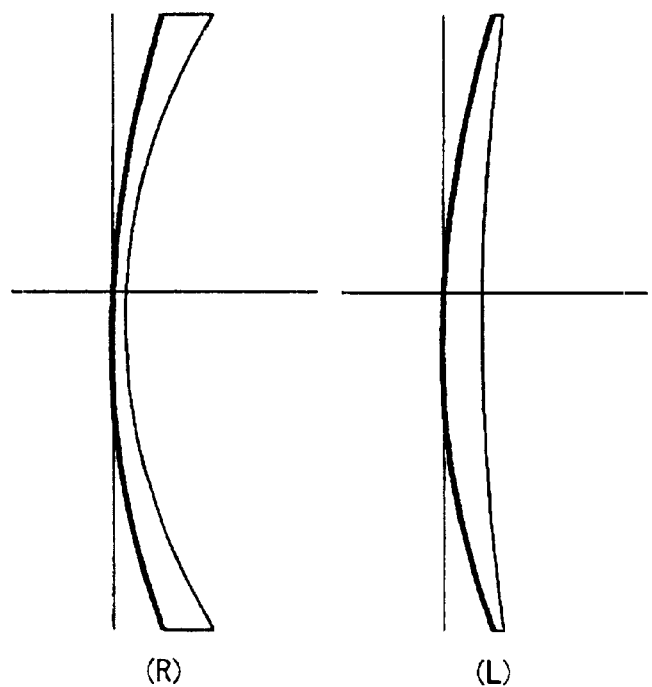
FIGS. 52A and 52B are sectional views of right and left lenses after the lenses of FIGS. 49A and 49B are redesigned such that the front surfaces have common shapes.
Figures 53A, 53B:
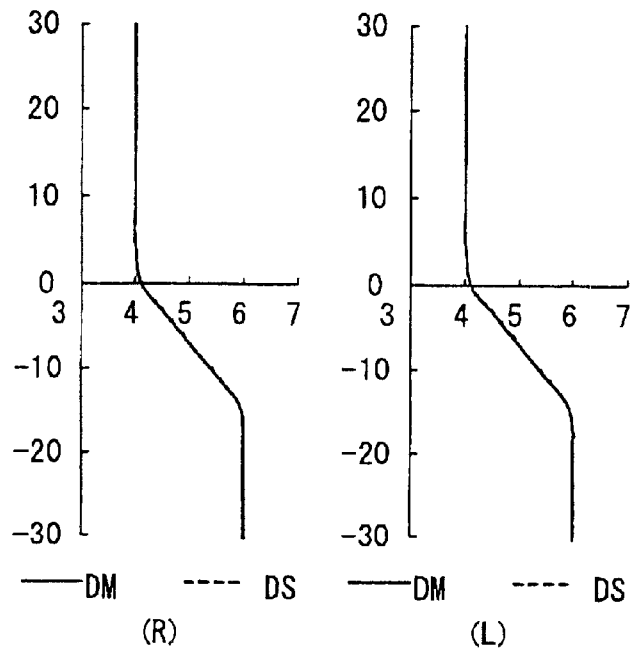
FIGS. 53A and 53B are graphs showing variations of surface powers of front surfaces of the right and left lenses of FIGS. 52A and 52B.
Figures 54A, 54B:
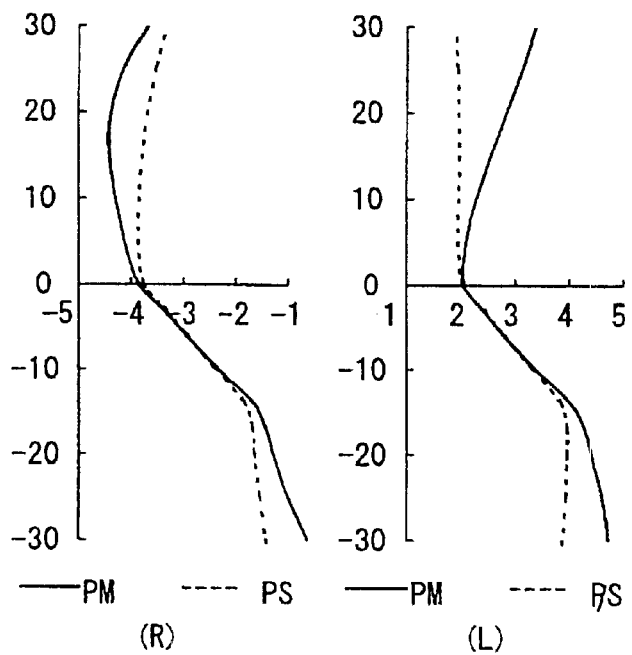
FIGS. 54A and 54B are graphs showing variations of "as-worn" powers of the right and left lenses of FIGS. 52A and 52B.
Figures 55A, 55B:
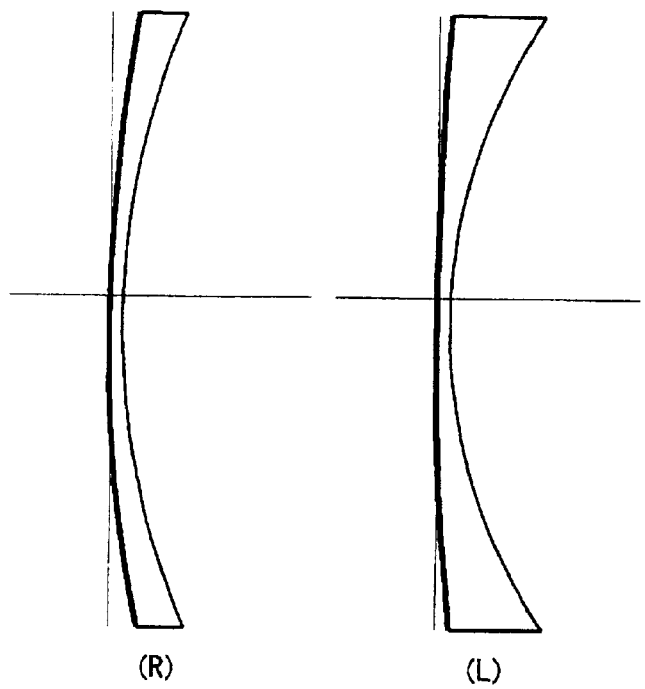
FIGS. 55A and 55B are sectional views of conventional progressive-power lenses that are independently designed through an aspherical design method.
Figures 56A, 56B:
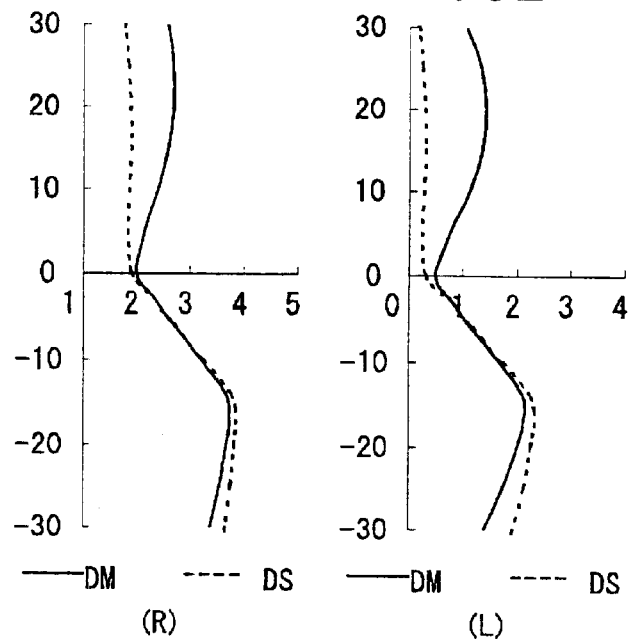
FIGS. 56A and 56B are graphs showing variations of surface powers of front surfaces of the right and left lenses of FIGS. 55A and 55B.
Figures 57A, 57B:
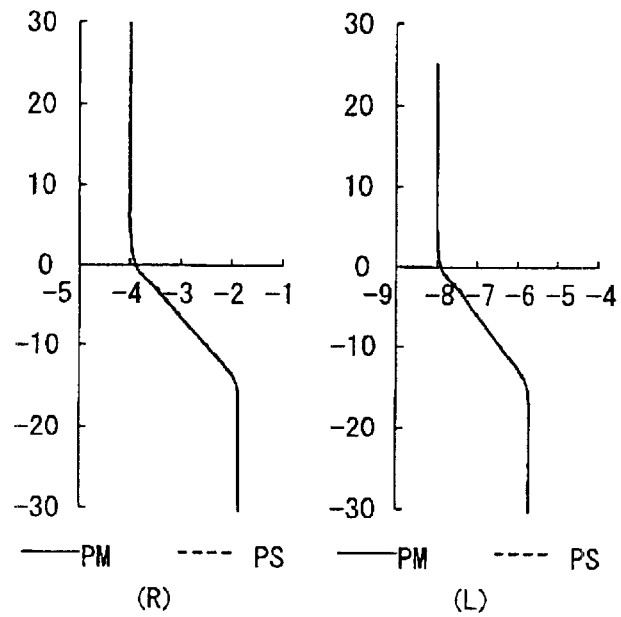
FIGS. 57A and 57B are graphs showing variations of "as-worn" powers of the right and left lenses of FIGS. 55A and 55B.
Figures 58A, 58B:
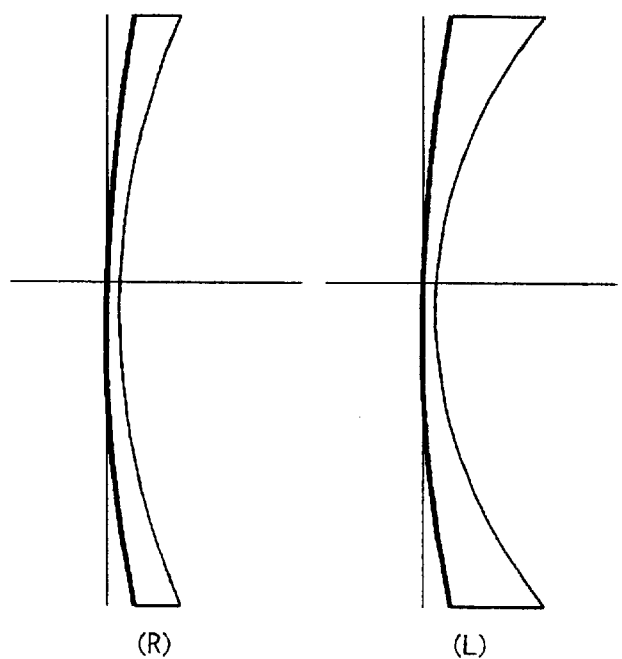
FIGS. 58A and 58B are sectional views of right and left lenses after the lenses of FIGS. 55A and 55B are redesigned such that the front surfaces have common shapes.
Figures 59A, 59B:
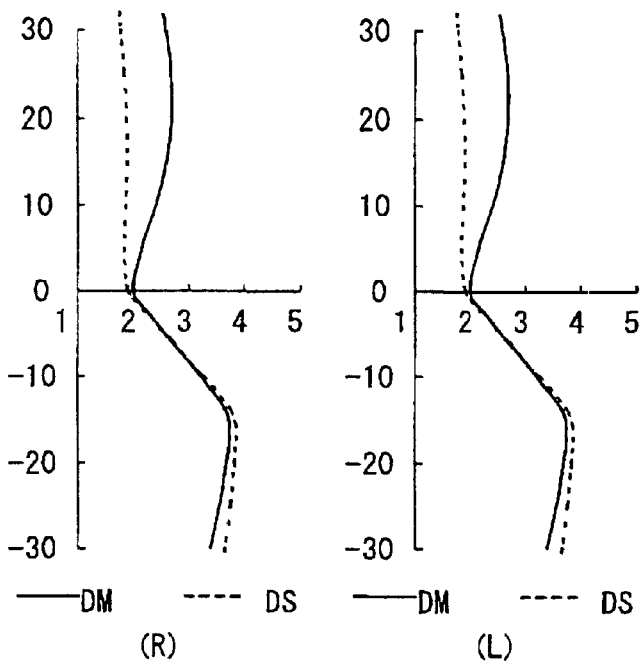
FIGS. 59A and 59B are graphs showing variations of surface powers of front surfaces of the right and left lenses of FIGS. 58A and 58B.
Figures 60A, 60B:
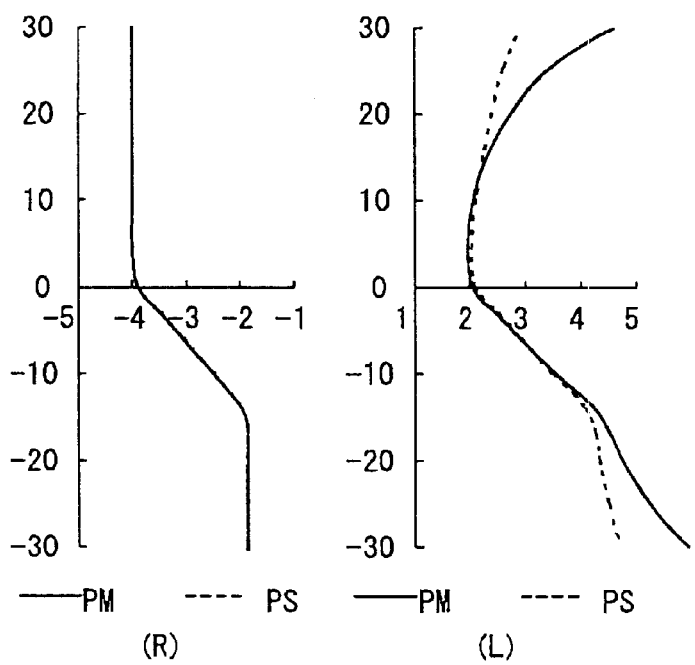
FIGS. 60A and 60B are graphs showing variations of "as-worn" powers of the right and left lenses of FIGS. 58A and 58B.

FIGS. 36A and 36B are sectional views of progressive-power lenses according to a third example of the second embodiment. The focal powers of the lenses of the third example are the same as that of the sixth comparative example, while the shapes of the front surfaces of the right and left lenses become closer to each other in order to enhance the outward appearance. Further the shapes of the progressive-power back surfaces are determined so as to reduce aberrations even when the shapes of the front surfaces become closer to each other. TABLE 20 shows numerical construction of each lens.

TABLE 20

|      | (R)    | (L)    |
|------|--------|--------|
| SPH  | −7.00  | 2.00   |
| ADD  | 2.00   | 2.00   |
| D1   | 2.50   | 4.00   |
| D2*  | 9.50   | 2.00   |
| T    | 1.32   | 3.59   |
| N    | 1.60   | 1.60   |
| φ    | 70.00  | 70.00  |

If the base curves of the right and left lenses are completely identical at 3.12 diopter that is an intermediate value between the base curves of the sixth comparative example, the curvature of the back surface of the right lens becomes too large and the back surface of the left lens becomes convex, which increases difficulty of processing. Therefore, in the third example of the second embodiment, the base curves become closer to each other but slightly different to enhance the outward appearance while keeping the ease of processing. The base curves of the right and left lenses are 2.50 diopter and 4.00 diopter, respectively.

FIGS. 37A and 37B are graphs showing variations of surface powers DM and DS of the progressive-power back surfaces of the right and left lenses. FIGS. 38A and 38B are graphs showing variations of "as-worn" powers PM and PS of the right and left lenses. The astigmatisms of the lenses of the third example substantially equal to that of the sixth comparative example. That is, the spectacle lenses of the third example of the second embodiment are balanced in the outward appearance because the base curves become close to each other, and they have satisfactory optical performance not less than that of independently designed spectacle lenses.

The present disclosure relates to the subject matters contained in Japanese Patent Applications No. 2000-054736, filed on Feb. 29, 2000, and No. 2000-317239, filed on Oct. 17, 2000 which are expressly incorporated herein by reference in their entireties.

What is claimed is:

1. A manufacturing method of spectacle lenses, comprising:

selecting and determining a substantially common shape for front surfaces of right and left lenses among predetermined shapes based on specifications of said right and left lenses;

calculating shape data of back surfaces of said right and left lenses, respectively, on the basis of said specifications and the selected shape of said front surfaces;

processing a back surface of a semifinished lens blank whose front surface is finished with an aspherical surface processing machine controlled based on said shape data of one of the right and left lenses; and processing a back surface of a semifinished lens blank whose front surface is finished with said aspherical surface processing machine based on said shape data of the other lens.

2. The manufacturing method according to claim 1, wherein said spectacle lenses are single-vision lenses.

3. The manufacturing method according to claim 2, wherein said specifications include spherical powers and cylindrical powers of said right and left lenses, respectively.

4. The manufacturing method according to claim 1, wherein said spectacle lenses are progressive-power lenses.

5. The manufacturing method according to claim 4, wherein said specifications include vertex powers of distance portion and addition powers of said right and left lenses, respectively.

6. The manufacturing method according to claim 1, wherein the selecting and determining the shape of said front surfaces and the calculating shape data of said back surfaces are implemented via computer program, and wherein said aspherical surface processing machine is operated under computer control based on the calculated shape data of said back surfaces.

7. The manufacturing method according to claim 6, wherein the calculating said shape data of said back surfaces is implemented via computer program with an optimization algorithm so as to reduce aberration while keeping a required focal power.

8. A manufacturing method of spectacle lenses, comprising:

calculating shape data of back surfaces of right and left lenses, respectively, so as to reduce aberration and to have a required focal power while employing a substantially common shape for front surfaces of said right and left lenses;

processing a back surface of a semifinished lens blank whose front surface is finished with an aspherical surface processing machine based on said shape data of one of the right and left lenses; and processing a back surface of a semifinished lens blank whose front surface is finished with said aspherical surface processing machine based on said shape data of the other lens.

9. The manufacturing method according to claim 8, wherein said common shape of said front surfaces stands midway between shapes of the front surfaces of said right and left lenses when these lenses are independently designed.

10. A manufacturing system of spectacle lenses, comprising:

an input device that is employed to input specifications of right and left lenses;

a selecting device for selecting and determining a substantially common shape for front surfaces of said right and left lenses among predetermined shapes based on said specifications;

a calculating device for calculating shape data of back surfaces of said right and left lenses, respectively, on the basis of said specifications and the selected shape of said front surfaces;

an aspherical surface processing machine that process a back surface of a semifinished lens blank; and a controlling device for controlling said aspherical surface processing machine to process said semifinished lens blanks based on said shape data of back surfaces of said right and left lenses.

11. The manufacturing system according to claim 10, wherein said spectacle lenses are single-vision lenses.

12. The manufacturing system according to claim 10, wherein said spectacle lenses are progressive-power lenses.

13. The manufacturing system according to claim 10, wherein said selecting device, said calculating device and said controlling device are implemented via computer program.

* * * * *